United States Patent [19]

Segarra et al.

[11] Patent Number: 4,466,063

[45] Date of Patent: Aug. 14, 1984

[54] SYSTEM INTERCOMMUNICATION PROCESSOR USED IN DISTRIBUTED DATA PROCESSING SYSTEM

[75] Inventors: Gérard Segarra, Jossigny; Francois J. Phulpin, Boussy Saint Antoine, both of France

[73] Assignee: U.S. Philips Corporation, New York, N.Y.

[21] Appl. No.: 521,021

[22] Filed: Aug. 8, 1983

Related U.S. Application Data

[63] Continuation of Ser. No. 202,809, Oct. 31, 1980.

[30] Foreign Application Priority Data

Nov. 7, 1979 [FR] France ................................ 79 27410

[51] Int. Cl.³ ............................................ G06F 15/16
[52] U.S. Cl. ...................................................... 364/200
[58] Field of Search ......................................... 364/200

[56] References Cited

U.S. PATENT DOCUMENTS

| | | | |
|---|---|---|---|
| 3,648,256 | 3/1972 | Paine | 364/200 |
| 3,680,053 | 7/1972 | Cutton | 370/86 X |
| 3,768,074 | 10/1973 | Sharp | 364/200 |
| 3,879,710 | 4/1975 | Maxemchuk | 370/89 X |
| 3,934,232 | 1/1976 | Curley | 364/200 |
| 4,019,176 | 4/1977 | Cour | 364/900 |
| 4,099,233 | 7/1978 | Barbagelata | 364/200 |
| 4,223,380 | 9/1980 | Antonaccio | 364/200 |
| 4,271,518 | 6/1981 | Birzele | 364/200 X |

*Primary Examiner*—Raulfe B. Zache
*Attorney, Agent, or Firm*—Thomas A. Briody; Jack E. Haken; James J. Cannon, Jr.

[57] ABSTRACT

A distributed data processing system including a general, communications network, and a plurality of local systems which each include a central processing unit, associated memory, and at least one peripheral device. The control of the intercommunication is effected by respective systems intercommunication processors, each attaching one local system to the network. Each SIP has a programmed processor, a local and a network interface, and a bidirectional buffer. The system intercommunications processor will provide for address and code parameter translation, resource requesting and allocating access granting and protecting of the local resources and information objects, while sharing resources among plural requesters. Also failure management and control panel simulation is effected by the systems intercommunications processor.

8 Claims, 18 Drawing Figures

FIG.12

SYSTEM INTERCOMMUNICATION PROCESSOR USED IN DISTRIBUTED DATA PROCESSING SYSTEM

This is a continuation of application Ser. No. 202,809, filed Oct. 31, 1980.

BACKGROUND OF THE INVENTION

1. Field of the Invention

The present invention relates to a distributed data processing system having several local systems (LS), each local system having at least one central processing unit (CPU) with its associated memory, peripherals and processes, where the communication between said LS's takes place via a general communications network and where the control of said data processing system is distributed over the respective local systems.

2. Description of the Prior Art

Technological progress made in the field of large scale integrated circuits (LSI) and their low cost are causing an evolution in the architecture and use of data processing systems towards distributed systems. Also, different kinds of processors are beginning to appear, such as processors (CPU) reserved solely for users, special purpose processors (allocation of resources, data base management, communications, etc.) and service processors.

In addition, the local interconnection of data processing systems distributed over the operating areas of an organization, having as objectives communications and the sharing of resources, imply that procedures and protocols are defined which make possible the initialization of the distributed systems, communication between user application programs and the best possible use of resources by sharing phase among said applications. The Appendix contains a selection of references to the prior state of the art.

All the references given in the Appendix are of a general nature. In reference (1) it seems that the distributed control of the overall system is based in each LS which, in this case, is a processor with its main store. References (2) and (3) describe a distributed communications network for packet data transmission in which the user process and resources are distributed. In this system, however, all the processing units are identical and the interconnections between units are made via a "bus" hierarchy. References (4) to (7) describe either distributed processing (4) or distributed control (5 and 6), or the distribution of all the components of a system (7).

SUMMARY OF THE INVENTION

In the present invention, the various functions characteristic of a distributed system are separated from the LS and located in their respective functional layers. By way of example, the communication procedures, are located in the functional communication layer. Certain other coordination, control, initialization functions, etc., are located in the functional coordination layer, which is the subject of the present invention. Other differences between this invention and the prior art aforementioned will be clearly shown in the description of an embodiment.

This invention is designed for use in a distributed system with the following features:
  the distributed system is a medium-scale type (MSDS) with the ability to interconnect several tens of local systems by the general communications network and to execute a number of different application programs;
  the general communications network used to communicate between the local systems is an optical bus (loop or star);
  the transmission rate on the optical bus provides a transfer speed in both directions of 300 kwords/sec (16 bits/word) per local system;
  the physical characteristics of the optical bus limit the distribution of the local systems to distances of a few kilometers.

The subject of this invention is limited to the coordination layer managed by the system intercommunication processors (SIP) located between the local systems (LS) and the communications network.

The present invention is characterised in that the communication between said LSs is managed by the SIPs located in a functional coordination layer between each of said LS and a functional communication layer, each of said SIP comprising special hardware and software providing for the functions of coordination, communication, control, initialization and simulation relating to the various LS, a. said coordination and communication functions further comprising means for the translation of addressing and coding parameters between said LS, means for interrogating, analyzing and localizing resources relating to an LS request, and means for selecting the best resource where there is a choice between several available undedicated resources;

b. said control functions further comprising protective mechanisms controlling the access rights to the resources and objects of each LS at the level of the associated SIP, means for defining the authorized interactions between the applications of said distributed data processing system, means for optimizing the use of resources by sharing them fairly between the applications, means of detecting a failure in a component of said distributed system by monitoring the coherence of messages and by retransmitting the messages in which a loss of information is detected, and means for isolating an LS by disconnection when the transmission or reception of a message is impossible;

c. said initialization functions further comprising means for the remote loading from a pilot LS having remote loading facilities of the read/write memories relative to each of said LS and the corresponding SIP itself, and means for remotely starting from any site the programs loaded into the LS and SIP;

d. said simulation functions further comprising the simulation of commands sent from a control panel comprising means for resetting to an initial state the defined components of said distributed system, loading of initial programs, causing a program to be carried out instruction by instruction, loading and reading the general registers of an LS, interrupting programs being processed and starting special programs.

One of the main objectives of this invention is to take advantage of technology by constructing a system (SIP) specialized in the functions of coordination, communication, control and initialization within the context of a distributed data processing network. The simulation and testing of the SIP design described in this patent application has shown that this invention can provide an optimal solution for a distributed system with the characteristics described above.

Other objectives and advantages of this invention are summarized below.

- As the SIPs are the coordinators of the distributed system, they are located in a functional layer which is as close as possible to the communications network in order to provide fast communication of information relating to the capacities and states of the data processing units interconnected during the issue of service requests, to involve in a transaction only the units concerned thereby and to detect any error or fault as rapidly as possible, to prevent their propagation towards the upper layers and to make possible a fast reconfiguration of the overall system.
- The transformation of identification parameters retains for each processor or processing unit some degree of autonomy and independence reflected in the existence of their own operating system and storage space.
- The localization of resources makes it possible to respond to the requests of each LS in the best possible way. If each SIP knows the state of the local capacities and resources, it will be able to analyze a request when a process asks for a resource, and to give a positive reply if it is in a position to satisfy it.
- The facility for selecting the most available resource when there is a choice between several undedicated resources thus reduces waiting time and balances the load on the various units.
- The provision of protective mechanisms at the level of each SIP prevents illegal operations on objects or resources by applications which do not possess access right to them.
- The definition of the authorized interactions between the applications thus guarantees their protection and may also be used to optimize the use of resources by sharing them equally between the applications.
- The failure of a component of the system must be detected as quickly as possible so that it may be isolated and thus prevent the propagation of errors which it could generate. The SIP can analyze the coherence of the requests received and also monitor the behaviour of the various units in relation to the defined procedures and protocols. These methods of analysis must not only prevent any disturbance in the valid sub-assemblies of the system, but also make possible its dynamic reconfiguration in order to keep it operational relative to the whole set of applications to be processed.
- The initialization functions give the system flexibility in loading and starting the various units and LS in different conditions, e.g. in the event of errors, the replacement of units for maintenance, etc.
- The simulation of the commands of a control panel originating from a remote LS provides for diagnosis and initialization functions on any of the LS.

These advantages and others related to this invention will be clearly shown in the following description of an embodiment. The description refers to the P 800 series of mini and micro-computers manufactured by Philips Data Systems. Only the architecture of the P 800 relevant to this invention (e.g. interface) is described. The detailed descriptions of the P 800 system will be found in the references quoted.

BRIEF DESCRIPTION OF THE DRAWINGS

In the drawings:

FIG. 12 is the microprogram relating to the exchange mechanism described in FIG. 11.

The SIP auto-selection mechanism is described with reference to FIG. 17.

Figure 18:
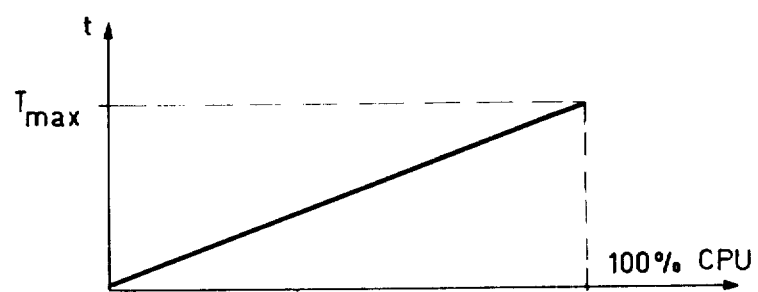

FIG. 18 shows the response time of a processing unit (CPU) in relation to its load.

The Appendix includes:

(1) a description of the physical interface between the SIP and a local P 800 system;

(2) a description of the physical interface between the SIP and the CM;

(3) a list of references which may be regarded as the prior art in the context of this invention.

The architecture of the P 800 mini and microcomputers is decribed in the following documents published by Philips Data Systems:

P 856M/P 857M, CPU Service manual 5111-991.2695X

P 856M/P 857M, System handbook 5122-991-26931

P 851M, Vol. I CPU and memories technical manual 5122-991-28073.

DESCRIPTION OF THE PREFERRED EMBODIMENT

Figure 1:
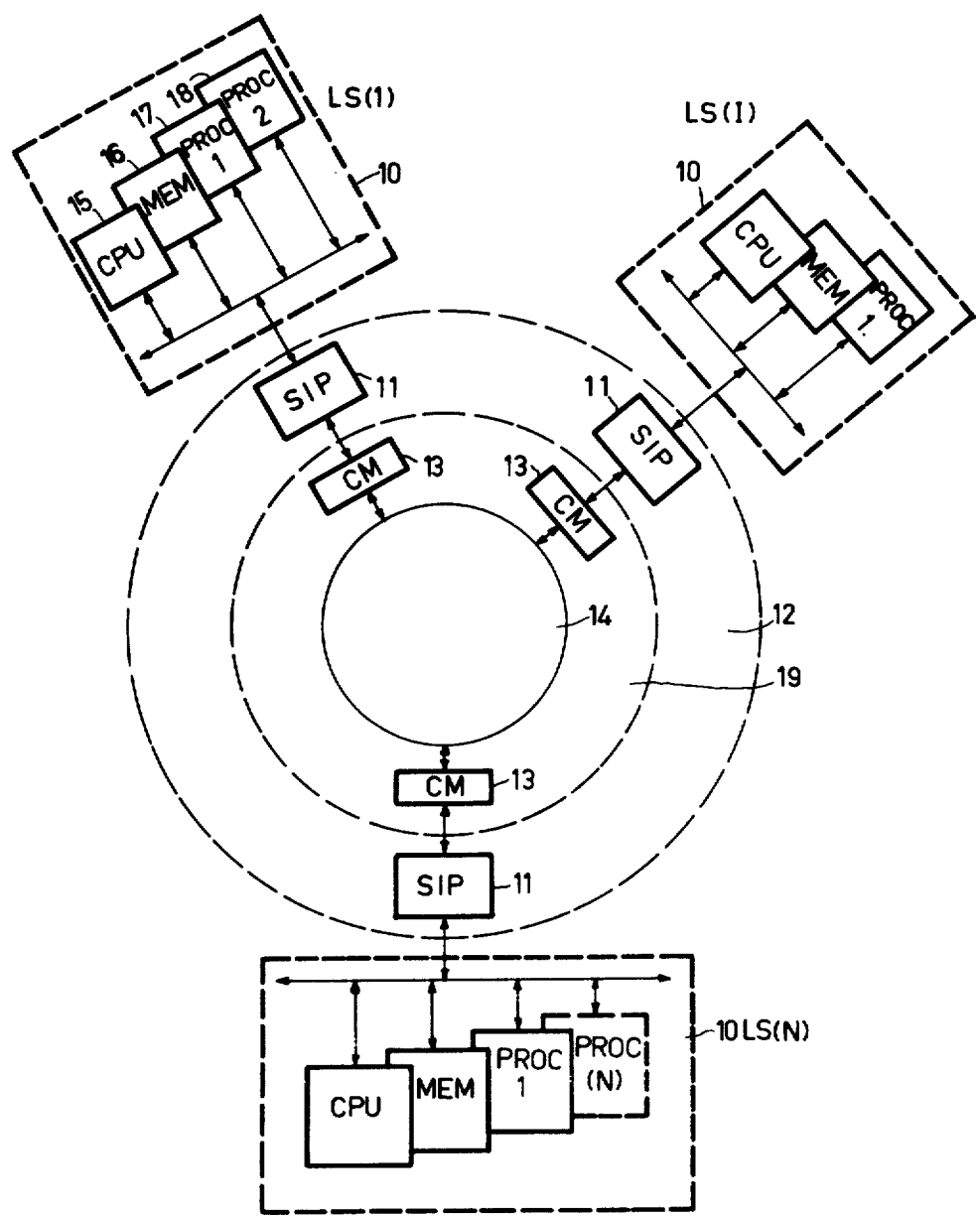
FIG. 1 is an overall diagram of a distributed data processing system showing the main sub-systems and functional layers.

On FIG. 1, 10 represents the various local systems (LS1 ... LS$_I$ ... LS$_N$). The SIPs corresponding to each LS are represented by 11 and are all located in the coordination functional layer represented by 12. SIP 11 communicate with communication network 14 (physical transfer) via respective communication modules (CM) 13 located in the communications functional layer (represented by 19). CM's 13 are responsible for monitoring the communications protocols in order to establish communication and ensure that information is validly transferred but this is not explained further for brevity.

An LS 10 may consist of various components, e.g. LS (1) consists of CPU 15, primary read/write and read only stored 16 and processes 17 and 18.

An application or user program may consist of several processes and may be distributed over several LS. Although it is designed for a well defined objective, the SIP by means of suitable initialization hardware and software is totally programmable from the exterior and can therefore easily be adapted for different functions. The characteristics of the MSDS already mentioned limit the flow rate of an LS (and thus of the SIP) to 300 kwords/sec bidirectional. It will be possible to improve the performance of the SIP by replacing the existing components by higher performance ones, e.g. microprocessors, read/write and read only stores, microprogrammed automats etc., but with the same architectural design base (instructions, interface, control, etc.). Hereafter, first the communication mechanisms between the SIP and the LS, the SIP and the communications network via the CM, the instructions used and the connecting blocks are described in a general manner. Next follows a detailed description of the architecture of the SIP. In general, the SIP uses the instructions of a P 800 system.

COMMUNICATION MECHANISMS AND INSTRUCTIONS

Commands (CPU→SIP)

The LS uses an input/output instruction (CIO start) to inform the SIP (by way of synchronization) that a command is being communicated to it. This command may be directly transferred on the P 800 bus if it is no longer than a 16-bit word (register content specified by the CIO) during the execution of the instruction. (The physical interface between the SIP and the P 800 bus is defined in the Appendix.) Otherwise, the address of a control block located in the main store will then be specified (register content indicated by the CIO instruction). This control block contains all the instructions, parameters and data needed to execute the command.

Incoming request (SIP→CPU)

A command issued by an LS may give rise to one or more incoming requests communicated to the other local system(s) concerned.

An incoming request is communicated by the generation of an interrupt to CPU 15 of the LS concerned, which then executes an SST I/O instruction to identify the reason for the interrupt. After the SST instruction has been executed, the register specified by the latter instruction contains the address of an input request block located in the main store 16 and containing all the information pertaining to this request. The SIP uses a memory block previously allocated to it by the LS to receive incoming requests.

Issue of a result (CPU→SIP)

After an incoming request has been processed, the LS sends a result relative to this request to its associated SIP. This result is communicated by means of an I/O instruction (CIO start) executed by the CPU. The register specified by the instruction then contains the address of a result block previously buffered into the main store.

Communication of a result (SIP→CPU)

A result relating to the execution of a command in a local system different from the originating local system will be communicated to the originating LS via an interrupt sent to the CPU which will then execute an SST I/O instruction. The register specified by the SST I/O instruction, after its execution, contains the address of a block in the main store previously loaded with the result in question. The block used will have been allocated when the command was issued by the LS.

FORMAT OF THE RELEVANT 16-BIT INSTRUCTIONS

I/O instruction: CIO start

Bit 1 has always value zero. Bits 2-5 specify the instruction type Bits 6-8 (R1) specify a register; the content thereof either is directly a command or, alternatively, the address in the main store of a command or result block. During the execution of the instruction the content of register R1 is forwarded to the data bus. The two condition register bits (CR) are defined as follows 00 instruction accepted (LBR clear)
01 instruction refused (LBR full)
11 address not recognized LBR is an intermediate or mail-box register used for the transfer of commands between the processing module (PM) of the SIP and CPU. The final six bits are reserved for the SIP address: AD-SIP. The following commands are then contained in register R1:

Direct commands: CIO IPL

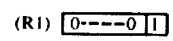

This command permits the execution of remote loading and remote starting of the requesting LS by an LS with initialization facilities (pilot system).

CIO buffer allocation to the SIP

This command permits the allocation of a buffer to the SIP, thus authorizing the communication of an incoming request to the LS.

CIO mode

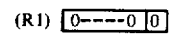

This command causes the SIP to make the transition from an initialization to an operational mode, thus inhibiting certain external operations which might perturb the local system (e.g. the simulation of orders sent to the control panel).

Indirect commands (R1) | Address of the command or result block / 0 | 1 |

This command allows the communication of the address of a block located in the main store containing the information relating to a command or a result to the SIP.

SST (READ STATUS)

| 0 | 1 0 0 1 | R1 | 1 | 1 | AD. SIP |

During the execution of the instruction, the content of the data bus is loaded into the register specified by field R1. The condition register (CR) is defined as follows:

00—instruction accepted (state WST)
01—instruction refused (state $\overline{WST}$)
11—address not recognized.

The contents of the register specified by R1 is then either directly an incoming request, or the address in the main store of an incoming request or result block.

SST direct
SST ACK (R1) | 0 ---- 0 | 0 |

This response means that the last indirect command has been stored by the SIP and thus possibly that the buffer used to communicate it is once more available for the system.

SST releasing of store in SIP (R1) | 0 ---- 0 | 1 |

This response means that, following the exceeding of the storage capacity of the SIP, there is once more space available to receive commands or results.

SST command unknown (R1) | Command block address unknown / 0 | 0 |

This response means that the command sent by the LS is unknown to the SIP, which has been unable to interpret it.

SST indirect (R1) | Address of incoming request or result block ≠ 0 | 1 |

In this case, the register specified by R1 contains the address in the main store of an incoming request or result block.

The SIP is provided with a mechanism permitting direct access to the main store 16 of the IS, allowing it to transfer information directly from its I/O (input/output) buffers into the main store and from the latter to its I/O buffers. This mechanism will be described later.

INTERACTION BETWEEN LOCAL SYSTEMS

Figure 2:
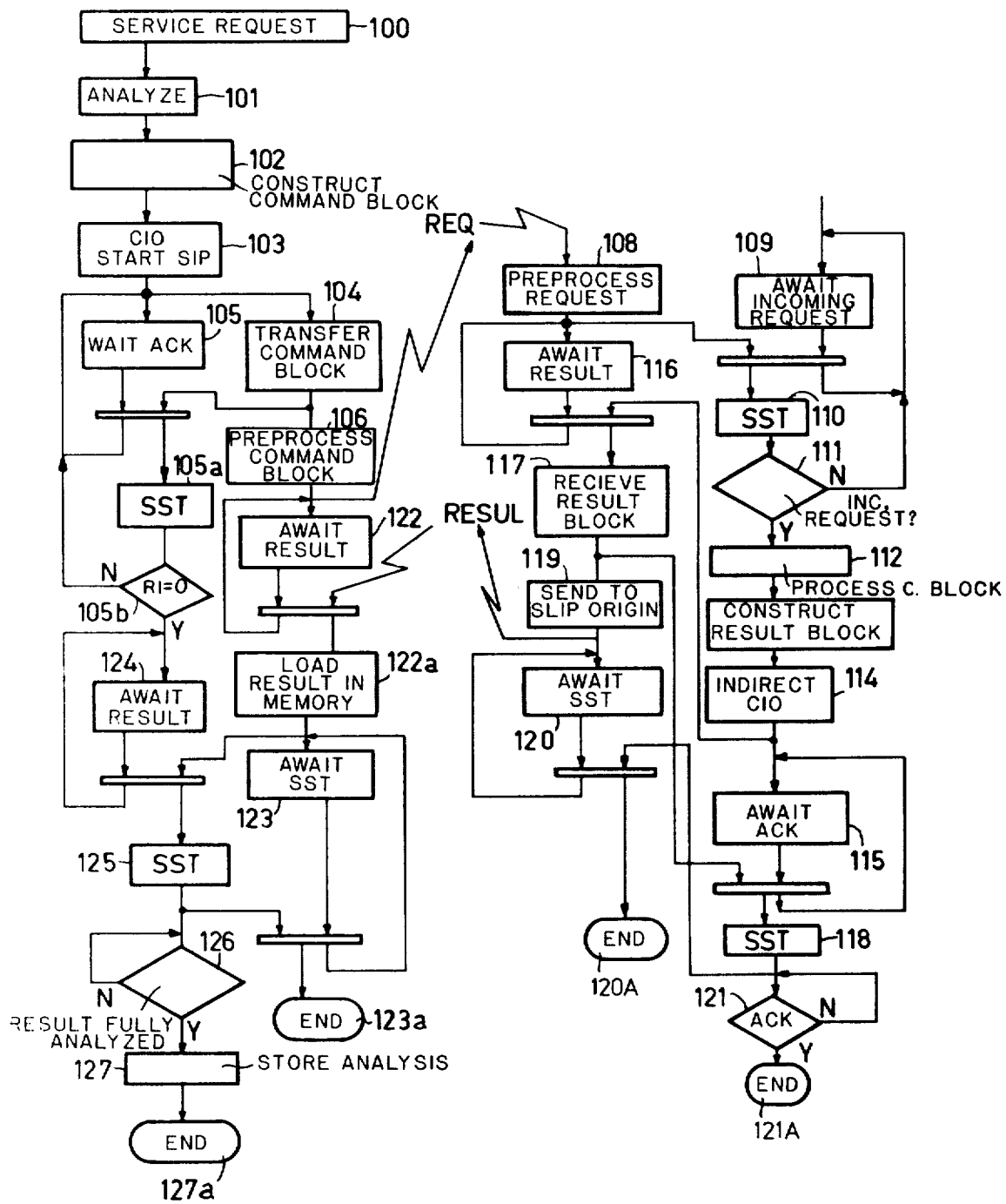
FIG. 2 is a flow chart describing the chaining of transactions between two local systems (LS) connected to the communications network.

FIG. 2 is a flow chart describing in a general manner the chaining of transactions between two local systems connected to the communications network.

FIG. 2 is generally divided into four flow columns, from left to right relating to the origin local system, the origin system intercommunications processor, the destination intercommunications processor, and the destination local system. When the LS origin wishes to communicate with an LS destination, a service request (100) is made and analyzed by LS (101), and the command block to be executed by the LS destination is constructed, (102). The CPU origin sends an indirect instruction CIO START to the SIP origin, signalling to it (synchronization) that it is being sent a command, resulting in the transfer of the command block to the SIP (the address of the block in the main store being specified), in (103) and (104). The SIP awaits the end of the execution of the transfer of the command block WAIT ACK (105). On receiving an interrupt from the SIP, the CPU executes an SST (105a). If the contents of R1 are zero, (105b), the LS awaits the result of the execution of the command AWAIT RESULT (124). Otherwise, the LS (R1 not zero) awaits the acknowledgment (105).

The command block is preprocessed by the SIP origin (106) and then a request is sent to the selected SIP destination after its localization via the CM and the communications network. This request is preprocessed by the SIP destination (108), which sends an interrupt (IT) to the LS destination. The CPU destination, which was in the await incoming request state (109), (relative to the SIP origin in question) executes an SST to identify the reason for the interruption, (110). If the latter, (111), is not an incoming request, the system returns to (109). If the reason for the interrupt is a request, the command block is processed (112), a result block is constructed (113), and the SIP destination is informed by an indirect CIO (114), while the CPU awaits the acceptance (AWAIT ACK) of the SIP destination (115). The SIP destination, which was in the state AWAIT Result (116) receives the block of results (117) and sends an interrupt (IT) at the end of the transfer to the CPU destination, which executes an instruction SST (118). The SIP destination, which sends the results (119) to the SIP origin, via a request on the communications network, awaits the instruction SST (AWAIT SST) (120) before switching to the state END. The CPU destination also switches to the state END (120A) on the acknowledgment SST, (121) (ACK).

The SIP origin which was in the state (AWAIT Result) (122), after loading the result into main memory of the LS origin (122a), sends an interrupt IT to the CPU origin and awaits SST, (123). The CPU origin, which was in the state (AWAIT Result) (124), then executes an instruction SST (125) which causes the SIP origin to switch to the state END (123A) and itself analyzes the results which are loaded in its main store (references 126 and 127) and then switched to the state END (127A).

Exchange mechanisms with the communications network via the Communication Module CM The SIP uses its input/output buffers (256 words) to communicate with the communications network via the CM by means of an interface SIP/CM defined in the Appendix. An I/O buffer contains the instructions, parameters and when applicable the data to be transmitted. The CM is capable of interpreting the command received and of executing it. After execution, the CM loads a status word concerning the execution into the I/O buffer which contained the command. The CM has direct access to the I/O buffers allocated to it. A buffer is allocated to the CM by the issue of an I/O instruction (write) to it. The contents of the bus then specify the address of the SIP buffer to be processed and its nature. The SIP receives an end of execution signal by the transmission of an interrupt from the CM. The SIP can then recognize the address of the buffer containing the result by executing an I/O instruction (read). Two output and two input buffers may be allocated to the CM simultaneously. This permits bidirectional transfers, processing a block of each type (input and output) simultaneously and chaining the stand-by buffer at the end of execution of the current buffers. The input/output buffers may be located throughout the addressable storage space accessible to the SIP/CM bus (64 kwords).

Format of the Relevant 16-bit Instructions:

Input/output instructions used

WRITE COMMAND

This instruction is used to synchronize the communication module (CM) for the execution of a command specified in the associated I/O buffer. A distinction may be made between four different commands:

1. Connection of an LS to the communications network. In this case parameters concerning the intended communications are supplied.
2. Disconnection of LS.
3. Data emission. This is reflected in a request for the issue of a data block (<64 kwords), specifying emission parameters.
4. Data reception. This is reflected in the provision of an empty block (<64 kwords) used to store incoming data.

Information present on the SIP/CM bus during the execution of this insturction:

Bus addresses (SIP→CM)

no significance

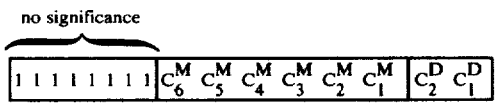

CM1 to CM6 specify the address of the CM CD1, CD2 specify the nature of the command defined below.

| CD$_2$ | CD$_1$ | Nature of command |
|---|---|---|
| 0 | 0 | Data emision (indirect) |
| 0 | 1 | Data reception (indirect) |
| 1 | 0 | Command specified on data bus (direct) |
| 1 | 1 | Connection (indirect) |

During a direct command the data bus specifies the command. In other cases, the data bus contains the address of the buffer containing the command to be executed.

Definition of the data bus during a direct command CD2, CD1 = 1 0.

→data bus

GPC = send a general purpose command to the defined destination.

This command is interpreted by the CM and may be used for various purposes.

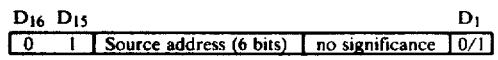

D1 = 0 connection of the defined source
D1 = 1 disconnection of the defined source.

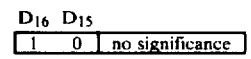

General disconnection from the communication network (e.g. the LS is isolated).

READ STATUS (SST)

This instruction is used to synchronize the SIP after the execution by the CM of a command sent to it. On receipt of an interrupt from the CM, the SIP executes a Read Status instruction and thus recovers the address of the buffer executed.

Information on the SIP/CM bus during the execution of this instruction:

Bus addresses (SIP→CM)

no significance

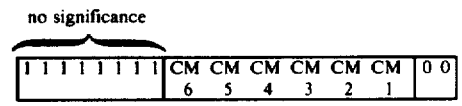

CM1 to CM6 specify the CM address.

Data bus (CM→SIP)

| Address of the buffer executed in the command WRITE |
|---|

SIP connection block to the communications network

| | | |
|---|---|---|
| word 1 | Connection | STATE word (16 bits) |
| word 2 | X------X | PSI (8 bits) |
| word 3 | X------X | TTV (8 bits) |
| word 4 | X------X | MNN (8 bits) |
| word 5 | X------X | MORYN (8 bits) |
| word 6 | X------X | RTV (8 bits) |
| word 7 | X-----X | MIRYN (8 bits) |
| word 8 | Connection block length (over 8 bits) | |
| word 9 | (6 bits) LS N$^o$ | X----------X 0/1 |
| . | (6 bits) LS N$^o$ | X----------X 0/1 |
| . | | |
| word i | LS N$^o$ | X----------X 0/1 |

The block is defined in the following way:
PSI: packet size
TTV: value of emission watch dog timer
MNN: indicates the maximum permissible number of
RNR during which a source station will repeat its call after receipt. This counter makes it possible to detect a continuous and abnormal busy state of a called station. RNR is a signal indicating that the destination (receiver) is not ready to accept a transmission.

MORYN: maximum number of retries in output mode.

RTV: value of the reception watch dog timer

MIRYN: maximum number of retries in input mode.

For the broadcast mode, the LS number defines the connected or disconnected LS, where the maximum possible number of connections is 64. The least significant bit defines whether or not there is a connection.

$\theta_R = $ RTV.FD indicates the maximum permissible time interval between the issue of two successive words by an LS origin. This timer makes it possible to detect a fault in the emitting LS.

$\theta_E = $ TTV.FD indicates the maximum time interval at the end of which all connected LS should have replied to a call (ASK). This timer makes it possible to detect a fault in the called LS on an addressed call and initiates the issue of data on a broadcast call (synchronization). FD is a base timer located in the CM producing a base time interval.

The connection mode makes it possible to define limited groups of users (applications) and to inhibit the broadcast mode for local systems without filter mechanisms (SIP) as determined by the local resources.

In order to modify the connection parameters in the connections block it is necessary to execute a disconnection before making a reconnection specifying new parameter values. The SIP may transmit after a connection.

Definition of the transmission block

| word 1 | W | B | TSW (STATUS word transmission) | |
|---|---|---|---|---|
| word 2 | Length of the data block (16 bits) | | | |
| word 3 | Address of the data block to be transmitted (16 bits) | | | |
| word 4 | C1 | C2 | Address dest. | Communication priority level |
| | data block | | | | indication

W: await RNR in broadcast mode

If W=0, transmit the message to the ready LS's on receipt of the first RNR.

If W=1, on receipt of an RNR wait and retry the call.

B=1 broadcast mode

B=0 addressed mode.

In addressed mode, the destination address specifies the LS destination. In broadcast mode, if Address Dest.=0, the message is intended for all destinations; otherwise, the specified address corresponds to a group of destinations. C2, C1 specify the position of the block in the message as described below.

| $C_2$ | $C_1$ | Block position |
|---|---|---|
| 0 | 0 | Intermediate |
| 0 | 1 | Start of message |
| 1 | 0 | End of message |
| 1 | 1 | Message complete |

The communication priority level (8 bits) is used in the event of conflicts (the highest priority is selected).

After a transmission, a block is constructed to define the result of the transmission.

Definition of the result block

| word 1 (TSW) | 0 | 0 | LS No. (6 bits) | X--X | $S_3$ | $S_2$ | $S_1$ |
|---|---|---|---|---|---|---|---|
| word 2 | RODBL | | | | | | |
| word 3 | RODBA | | | | | | |

The result of the transmission is loaded into TSW (word 1) of the transmission block.

S1 = 1 network not operational

S2 = 1 called LS abnormally occupied

S3 = 1 transmission fault on the network.

The number of the LS causing the problem in broadcast mode is also loaded into TSW.

RODBL defines the length of the data block still to be transferred (loaded in word 2) in the event of a fault.

RODBA defines the address of the data block to be transferred in the event of a fault (loaded in word 3).

After a connection is terminated, an LS may receive a transmission from another LS either in reply to a request or because a particular LS has something to send.

Definition of a reception block

| word 1 | RSW = 0 |
|---|---|
| word 2 | Length of the reception block allocated to the CM |
| word 3 | Address of the reception block |
| | Free space for reception of data |

RSW: reception status word, initially zero

Definition of the result of a reception block

| word 1 RSW | Source address (6 bits) | X--X | $S_3$ | $S_2$ | $S_1$ |
|---|---|---|---|---|---|
| word 2 | X------------------------X | | | | |
| word 3 | X------------------------X | | | | |
| | $C_2$ | $C_1$ | Source address | Packet length (8 bits) | |
| | Packet | | | | |
| | $C_2$ | $C_1$ | Source address | Packet length (8 bits) | |
| | Packet | | | | |
| | O | O | O-----------O | O-------O | |

The result is loaded into the RSW (word 1).
$S_1 = 1$ network not operational
$S_2 = 1$ transmission error (loss of message coherence)
$S_3 = 1$ reception fault on the network.

In the event of a fault, the address of the source is loaded. Words 2 and 3 in the reception block are kept unaltered. The data per packet are loaded into the space allocated to the CM. The significance of $C_2 C_1$ has been defined earlier. Several packets may be received, each defined by its length and its source address. At the end of a packet, an all zero word signals the end of reception.

The command will implicitly be regarded as having been executed if:
a. the input buffer is full;
b. if another buffer is allocated at the end of reception of the current packet;
c. on receipt of an end of text (ETX);
d. on detection of a fault.

Figure 3:
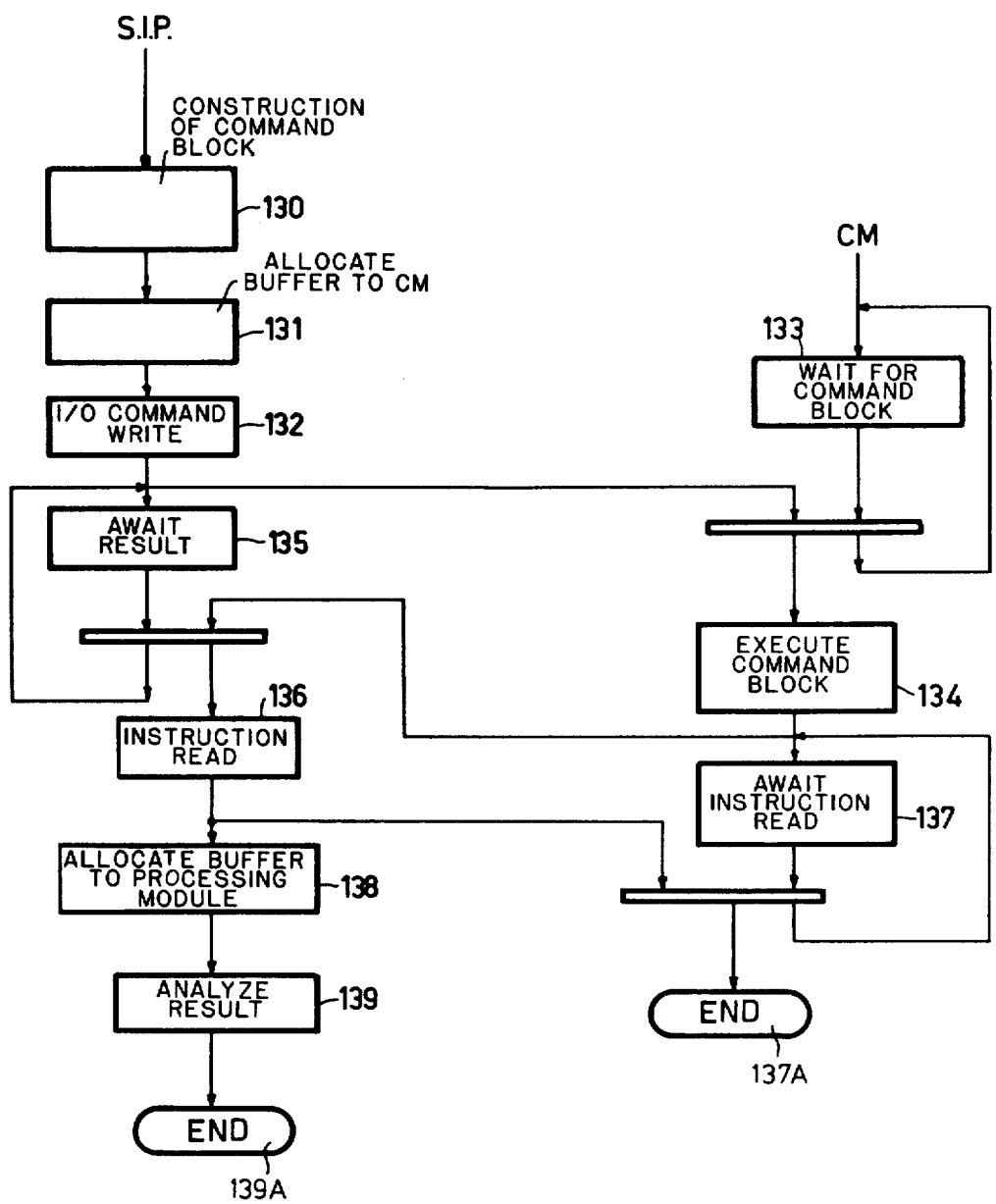
FIG. 3 is a flow chart describing the communications links between the SIP and the communications module (CM).

FIG. 3 is a flow chart describing the general enchaining of communications between the SIP (left column) and the CM (right column). The precise and fine grained structure of the exchange itself will be described later. After the construction of command block 130, the buffer is allocated to the CM by the SIP origin 131. Communication with the CM is established via an I/O command WRITE 132 and the command block is transferred to the CM. The CM, which is in the WAIT state 133, switches to execution state (execution of the command block 134). This implies that the command block is analyzed and executed. The CM then sends an interrupt (IT) to the SIP which is awaiting the result 135. The SIP responds to the IT by the I/O instruction READ which reads out the word from the result of the CM 136. The CM awaiting this command 137 switches to the END state (137A).

The SIP allocates the buffer to its processing module (PM) 138, analyzes the result 139 and switches to the END state (139A).

DESCRIPTION OF THE SYSTEM INTERCOMMUNICATIONS PROCESSOR

Figure 4:
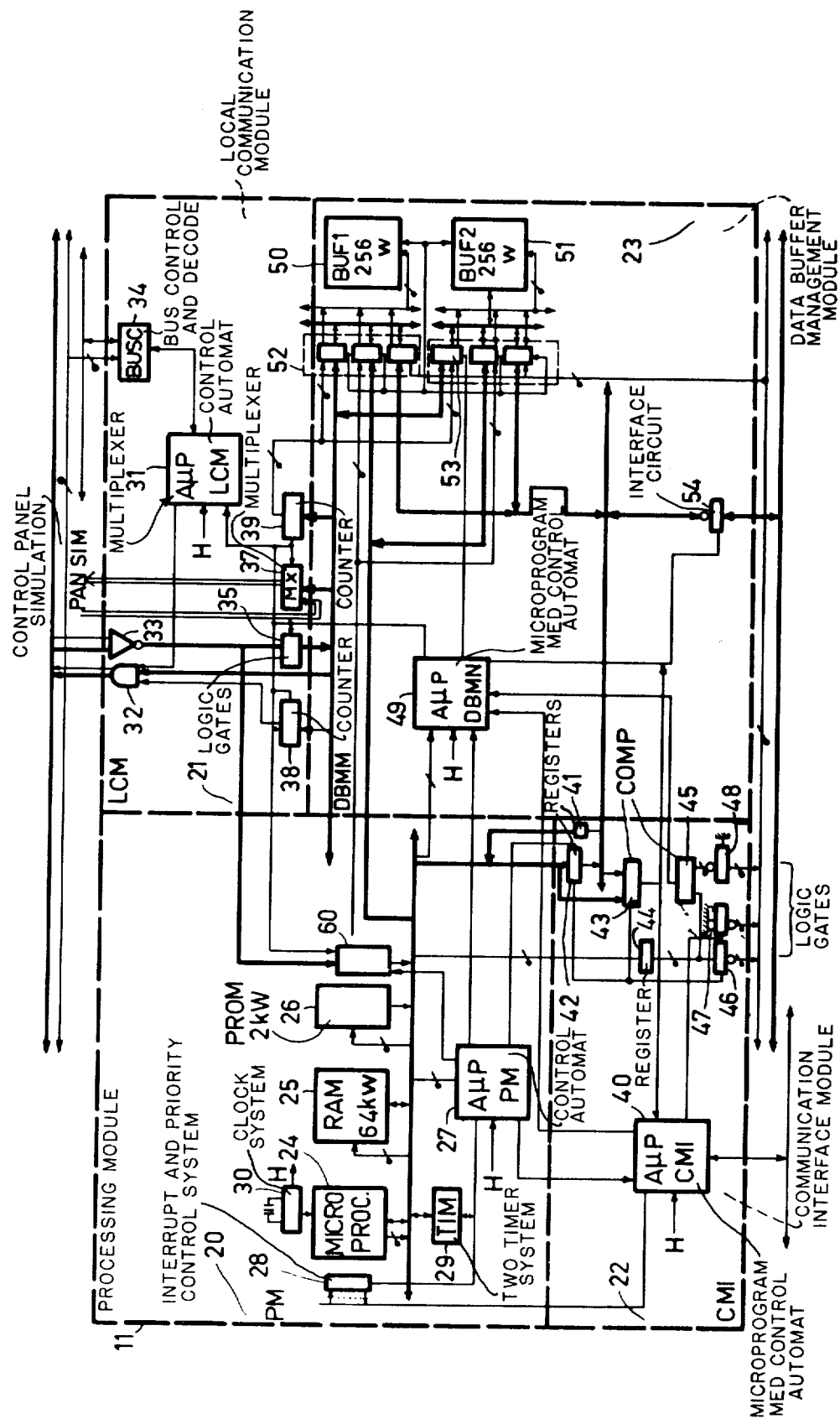
FIG. 4 is a block diagram of the SIP showing the main components and their connections.

FIG. 4 is a block diagram of the SIP showing the main components with their connections. The SIP can be partitioned into four modules providing its respective processing and communication functions. The four modules are the processing module (PM) 20, the local communication module (LCM) 21, the communication interface module (CMI) 22 and the data buffer management module (DBMM) 23. The PM, LCM and CMI operate in parallel, whereas the DBMM is used for communication between them. The main interconnections between the four SIP modules are shown, i.e. the address, data and control lines. The physical interfaces between the SIP and a local system 10 based upon a central processing unit of the Philips P800 serie and between the SIP and the communications network 14 via the CM 13 are described in the Appendix. The use of the principal interface and control signals will be described in detail hereinafter.

The interconnections between the four modules of the SIP (the internal bus) consist of the same address (16 lines) and data (16 lines) lines as for the external interfaces. Address lines are designated by a crossing sign therethrough.

The PM 20 consists of a microcomputer comprising mainly an INTEL 8086 microprocessor (24) with 64 kwords of read/write store (RAM) (random access memory) 25, and 2 kwords of reprogrammable read only memory (PROM) 26. The PM control automat CA is represented by 27. This mechanism (CA) 27 consists of a wired logic system (PROM) connected to an FPLA (field programmable logic array). The contents of the FPLA define the sequencing executed by the CA 27 as a function of the various possible states. The CA 27 will be described in detail. An interrupt and priority control system is shown by 28 and a system of two timers by 29. A clock system 30 provides the clock signals used in the SIP 11. The PM 20 performs the coordination, control and initialization functions already described.

The LCM 21 provides the communications with a P 800 LS 10, i.e. with the CPU 15, via I/O instructions and the interrupt mechanism, and with the main store 16 via direct memory access (DMA). In addition, the LCM 21 simulates commands from the control panel (PAN.SIM. in FIG. 4). The LCM 21 consists of a microprogrammed control automat 31, and interface and control circuits symbolically represented by 32 to 37. These include the interface circuits 32 and 33 to ensure compatibility (logic level, power, etc.) between the LCM and an LS. The circuits controlling the bus and decoding the instructions are indicated by 34. Counter 38 defines the direct access memory address of the main store 16 (DMA) and counter 39 defines the address of the buffer of the DBMM 23. Logic gates 35 control transfer of the address received from the LS and multiplexer 37 selects the input when a simulation is executed via the control panel.

The CMI 22 controls the interface with the CM 13 either via a processor interface or via a store interface, depending upon the initialized transfers (the interface is described in the Appendix). The CMI consists of a microprogrammed control automat 40 and circuits symbolically represented by 41 to 48. The logic gates 46 to 48 are interface circuits. Registers 41 and 42 define the address of the command and result block transferred between CMI 22 and CM 13 and register 44 is used as a mail box register for the address of CM 13. Comparator 43 compares the address of the buffer allocated to the CM at the end of the execution of the command with the address sent by the CM, thus the PM is informed that the buffer is to be released. Comparator 45 compares the address of the SIP buffer with the address sent by the CM.

The DBMM 23 consists of two I/O buffers with triple access represented by 50 and 51. These will be explained in more detail with respect to FIG. 7. Furthermore, there is provided a bidirectional allocation mechanism between:
  the PM and the P 800 LS (via the LCM),
  the PM and the CM (via the CMI),
  the P 800 LS and the CM (via the LCM and CMI).

The buffer allocation mechanism is located in the DBMM microprogrammed control automat 49, which in its turn is initiated by the PM. The system of multiplexers 52 and 53 provide the appropriate access under the control of CA 49, while the interface circuits with the CM are symbolically represented by 54.

Figure 5:
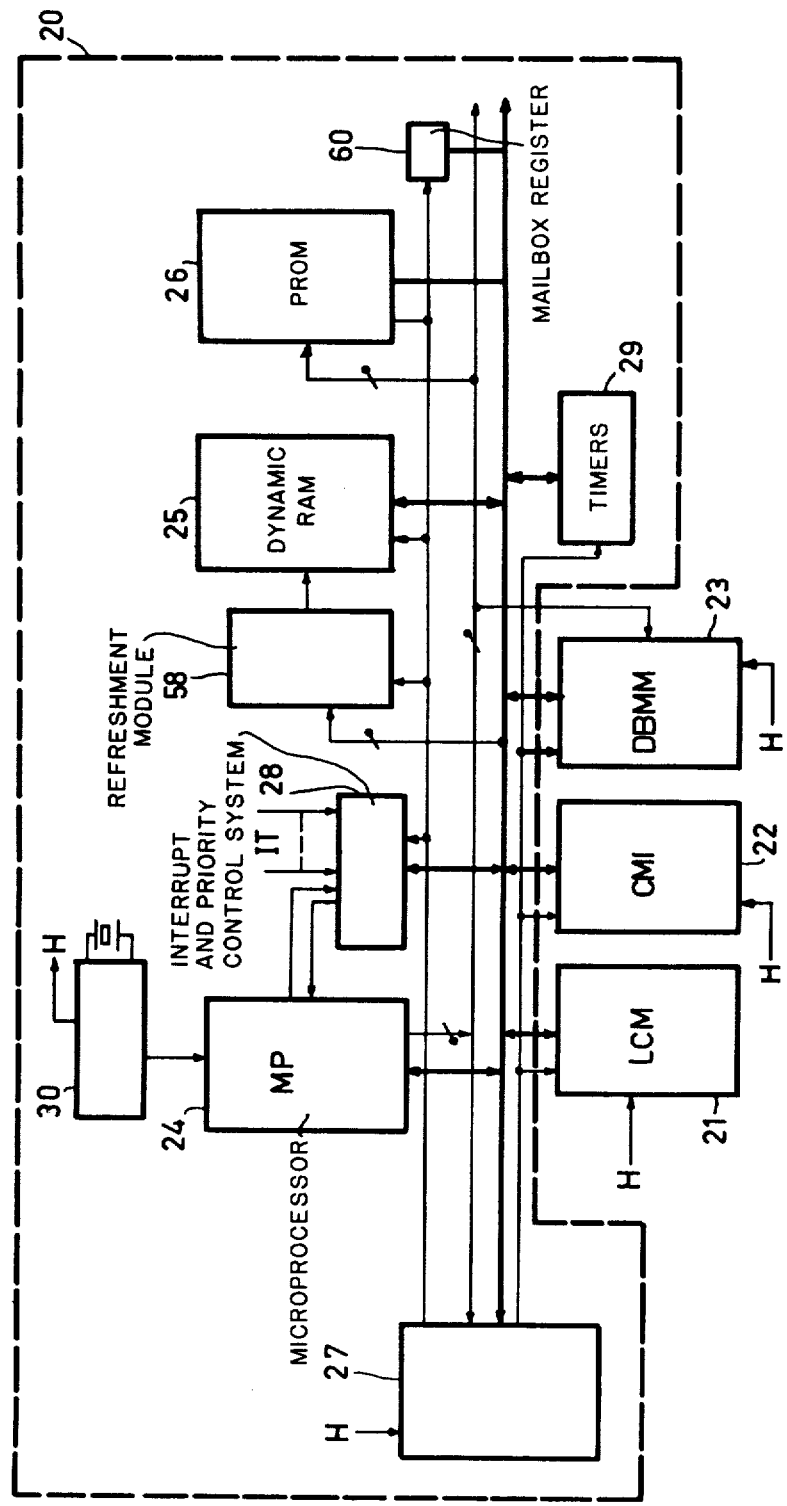
FIG. 5 is a functional diagram showing the components of the processing module (PM) of the SIP with its connections to the internal bus.

FIG. 5 is a functional diagram showing the components of PM 20 already described with respect to FIG. 4 and their connections to the internal bus (data and address control) needed to describe their operation within the context of the invention. Dynamic RAM 25 with a capacity of 64 kwords contains the coordination executive (CCE) and the tables describing the objects and resources of the LS. This dynamic memory is refreshed between input/output transmissions via a refreshment module 58 connected to the control and address bus controlled by CA 27. The 2 kword PROM 26 contains the processes for the initialization, remote loading and remote starting of the system. The programs contained in stores 25 and 26 are executed by microprocessor 24.

Timers 29 comprise two counters which may be programmed in time by microprocessor 24 and are used to verify that an expected event has indeed taken place within a given time interval. If this allotted time is exceeded, a fault is signalled which initiates recovery of information procedures.

Microprocessor 24 operates in interrupt mode and will thus be informed by means of the interrupt and priority control system 28 when certain events occur. In decreasing order of priority, these events are:

IPWF: (Power Supply Interrupt Fault)

This interrupt, which cannot be masked, is directly received by the microprocessor 24 when a failure in an LS power supply is detected. A power reserve of the order of a few milliseconds allows the PM to perform a context safeguard procedure helping to provide a reconfiguration of the total system, if necessary, once restarted.

TIME 2; TIME 3

These interrupts indicate that the time interval programmed in timer 1 (TIME 1) or 2 (TIME 2) has been reached.

IRTC

This interrupt is initiated by the LS real time clock. Microprocessor 24 may then broadcast this to all the LS in order to synchronize them.

CMI T$_1$; CMI T$_2$

These two interrupts indicate that the appropriate I/O buffers (50 and 51) are available and contain a result concerning the execution of the transmitted command.

PCCST 3

This interrupt shows that a mail box register (60) providing communication between the LCM and the PM contains a command from the LS addressed to the PM.

LCEOE

This interrupt indicates that the transfer of information requested by the PM from the LCM has terminated and the associated I/O buffer (50 or 51) is once more available to the PM.

IMBE

This interrupt indicates that mail box register 42 providing communication between the CMI and the PM is cleared and may be used to send a new command to the CM.

Figure 6:
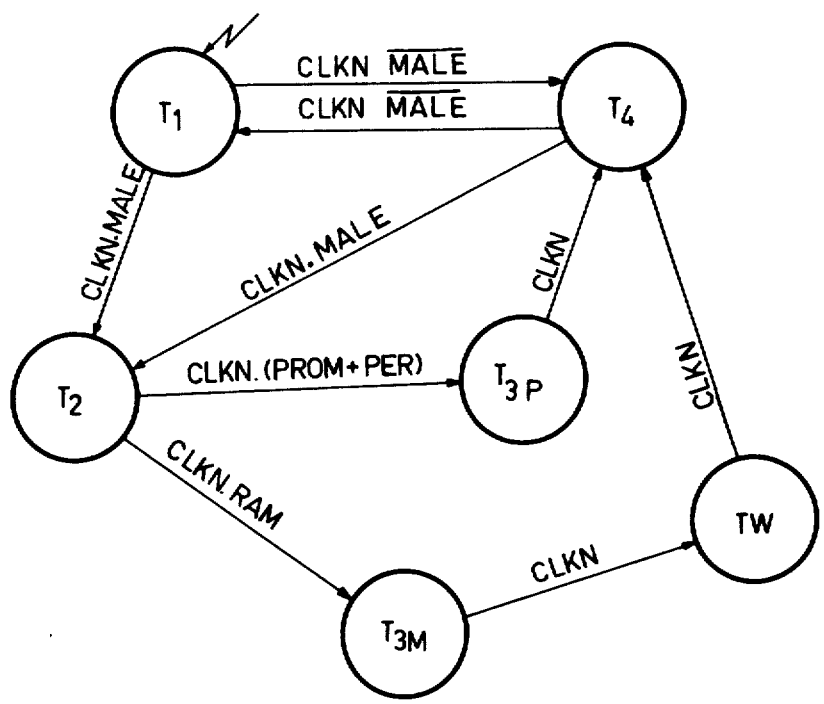
FIG. 6 shows the state sequence of the PM.

FIG. 6 shows the state sequences of the PM control automat 27. The possible states are:
  T$_1$: Idle State
  T$_2$: presentation of the addresses on the bus
  T3M and T3P: presentation of the data concerning the store (RAM) and the peripherals respectively
  T$_4$: refreshment of dynamic RAM 25.

When microprocessor 24 is not using the internal bus, the state sequencer alternates between T1 and T4 and a complete row of the RAM is renewed during state T4. Refreshment module 58 contains a counter which carries out the operation +1 on the address of the RAM every time that a row is refreshed. Either the bus address or the address defined by the refreshment counter is selected by means of a multiplexer. Where microprocessor 24 is using the bus, a row is refreshed when use of the bus is completed (T4).

TW: is the delay needed to provide the minimum access time specified by the I/O buffers (50 and 51) and to guarantee the minimum cycle time specified for the dynamic RAM when a microprocessor access directly follows a renewal cycle.

The signals conditioning the switching of the state sequencer are:
  CLKN: system clock. At each activation of this signal (active, negative), the state sequencer switches to another state.
  MCL: signal resetting the state sequencer to the initial state (T1).
  MALE: signal activated at the start of a bus cycle.

After an MCL (Master clear), the state sequencer is in state T1. In the absence of a bus cycle (MALE), the state sequencer switches between T1 and T4, controlled by the logic condition (CLKN.$\overline{\text{MALE}}$). If a bus cycle (MALE) is detected during T1 or T4, the sequencer switches to T2 (CLKN.MALE). If the bus cycle is a peripheral or PROM access, the sequencer switches to T3P, specified by the logic condition CLKN (PROM+PER) switching to T4 on the next CKLN. If the bus cycle is a RAM access, the sequencer switches to T3M (logic condition CLKN.RAM) followed by TW and T4.

The stores and peripherals are selected by decoding the address bits and certain command bits in the PM. Table I below specifies the decoding and selections.

TABLE I

| MIO | A19M | A17M | A15M | A14M | A13M | A12M | A11M | A10M | A9M | Selection |
|---|---|---|---|---|---|---|---|---|---|---|
| 0 | X | X | 0 | 0 | 0 | 0 | 0 | 0 | 0 | Selection of the CM (1) |

TABLE I-continued

| MIO | A19M | A17M | A15M | A14M | A13M | A12M | A11M | A10M | A9M | Selection |
|---|---|---|---|---|---|---|---|---|---|---|
| 0 | X | X | 0 | 0 | 0 | 1 | 0 | 0 | 0 | Selection of LCM |
| 0 | X | X | 0 | 0 | 1 | 0 | 0 | 0 | 0 | allocation of buffer No 1 to the PM |
| 0 | X | X | 0 | 0 | 1 | 0 | 0 | 0 | 1 | allocation of buffer No 2 to the PM |
| 0 | X | X | 0 | 0 | 1 | 0 | 0 | 1 | 0 | allocation of buffer No 1 to the CM |
| 0 | X | X | 0 | 0 | 1 | 0 | 0 | 1 | 1 | allocation of buffer No 2 to the CM |
| 0 | X | X | 0 | 0 | 1 | 0 | 1 | 0 | 0 | allocation of buffer No 1 to the LCM |
| 0 | X | X | 0 | 0 | 1 | 0 | 1 | 0 | 1 | allocation of buffer No 2 to the LCM |
| 0 | X | X | 0 | 0 | 1 | 1 | 1 | 1 | 0 | RAZ IRTC Real-time clock (2) |
| 0 | X | X | 0 | 1 | 0 | 0 | 0 | 0 | 0 | timer initialization (3) |
| 0 | X | X | 1 | 0 | 0 | 0 | 0 | 0 | 0 | initialization system IT (4) |
| 1 | 0 | 0 | 0 | most significant address bits | | | | | | selection RAM 64 K (5) |
| 1 | 0 | 1 | 0 | 0 | 0 | 0 | 0 | 0 | 0 | selection buffer No 1 (5) |
| 1 | 0 | 1 | 0 | 0 | 0 | 0 | 0 | 0 | 1 | selection buffer No 2 (5) |
| 1 | 1 | 1 | 1 | 1 | 1 | 1 | most significant | | | selection PROM (5) |

The bit MIO defines the type of store access to the peripheral. The following notes (1)-(5) are explained:

In Table I (1) The address bits A1M to A8M specify the address of the CM concerned and the nature of the command.

(2) The real-time clock interrupt (IRTC) is reset to zero.

(3) The address bits A1M, A2M specify the number of the initialized timer.

(4) I1M specifies the command word sent.

(5) A1M to A8M indicate the least significant address bits of the store.

The bits marked "X" do not matter.

The internal communication mechanism of the SIP and the I/O buffers of the DBMM will now be described. The location of the SIP between an LS and the communications network means that the SIP has to manage a great deal of information passing through it. This information follows various paths depending upon its nature and origin. A distinction must be made between:

the commands to the SIP issued by the LS and received by the PM of the SIP which preprocesses them;

the outgoing requests emitted by the PM to the communications network;

the incoming requests received from the communications network and sent to the PM for analysis. After analysis, these requests may be communicated to the LS by the PM.

the data emitted by an LS to the communications network;

the data received from the communications network and sent to the LS.

The communications network, which makes possible a continuous bidirectional traffic of 300 kwords per second, also implies rapid transfers through the SIP. Outside the PM processing time, it is therefore important for the transit time of the information through the SIP to be as rapid as possible.

To attain this objective, the invention makes use of the following facilities:

use of the modules (LCM, CMI) controlled by the PM and working in parallel with it;

use of a communication mechanism facilitating the exchanges between the three components under consideration, (LS, PM, communications network via the CM).

Figure 7:
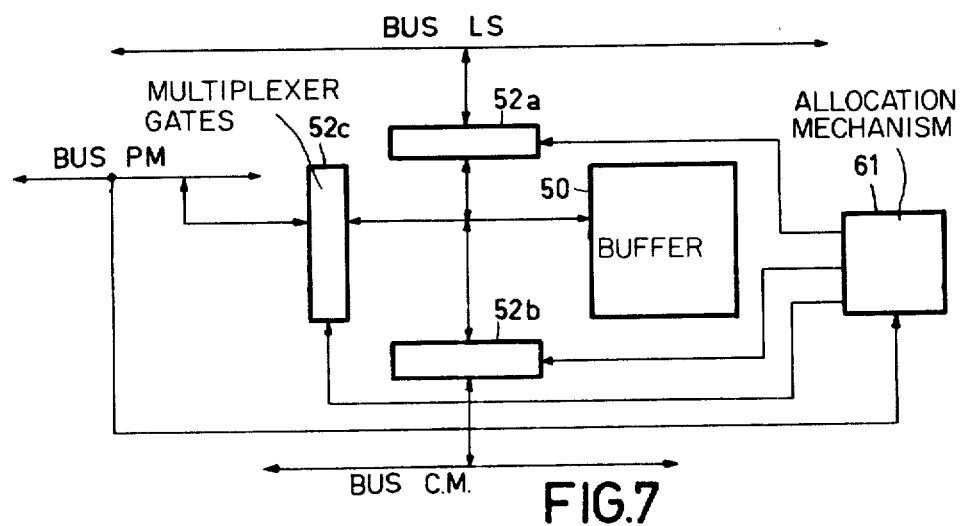
FIG. 7 shows the principle of the allocation mechanism of an input/output buffer.

The communication mechanism comprises the two I/O buffers 50 and 51 (each of which are 256 word RAM) with triple access, and an allocation mechanism associated with each of them. FIG. 7 shows the principle of this mechanism for a buffer (e.g. 50). In FIG. 7, buffer 50 may be independently allocated to one of the three components concerned (PM, LS, CM) via the PM bus, the LS bus or the CM bus and multiplexer 52 in FIG. 2, which consists of selectable gates 52a, 52b and 52c shown in FIG. 7. The allocation control is carried out by the PM itself and the allocation mechanism 61 is a wired logic mechanism contained in CA 49 of the DBMM. A module (LS, CM) which has been allocated a buffer may use the latter exclusively as long as it has not been restored to the PM. In fact, the use of an I/O buffer by one of the three modules consists in carrying out an information exchange with the LS or with the communications network via the CM.

The allocation mechanism is controlled by the PM by means of the following I/O instructions (reference to Table I):

Allocation of the buffer to the PM;
Allocation of the buffer to the LCM;
Allocation of the buffer to the CM which has direct access to this buffer.

The allocated buffer contains the execution order which is interpreted by the module responsible for processing the requested exchange. The PM is informed of the end of processing via an interrupt (CMIT1, CMIT2, LCEOE); it may then either analyze the information received or use the buffer concerned for another exchange.

Figure 8:
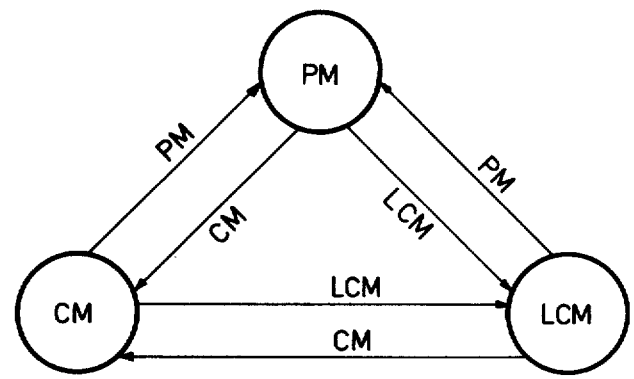
FIG. 8 shows the state sequences of the allocation mechanism between the components concerned.

FIG. 8 shows the sequencing of the allocation mechanism between the three modules PM, LCM and CM.

The LCM 21 will now be described in detail. This module controls the transfers between the main store 16 of an LS and the I/O buffers 50 and 51 allocated to it. It manages the interface with the CPU 15 and simulates the operator commands of the control panel.

The interface with the CPU 15 is organized on following principles:

1. When a CIO start addressed to the SIP is decoded, there are two possibilities:
   a. The LCM is in an exchange state. In this case, the LCM loads the contents of the data bus into the mail box register (60, FIG. 5), transmits an interrupt (PCCST3) to the PM and switches to the execute state. The LCM returns to the exchange state when the PM executes a read mail box register 60 instruction via the selection of the LCM (Table I).
   b. The LCM is in an execute state. In this case the LCM rejects the CIO start (CR = 1).
2. On the decoding of an SST addressed to the SIP, there are also two possibilities:
   a. The LCM is not ready to provide a status word to the LS ($\overline{WST}$), the SST is thus rejected (CR = 1)
   b. The LCM is ready to communicate a status word to the LS via an interrupt (WST); thus, when the instruction SST is decoded, it is accepted and the status word is sent on the data bus.

Figure 9:
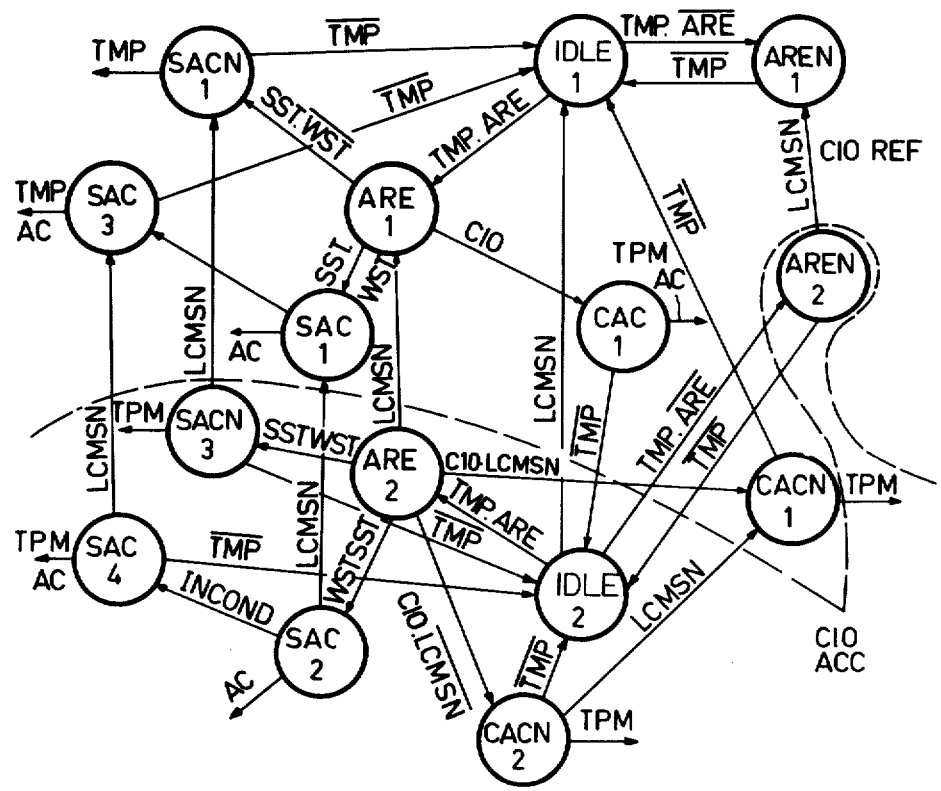
FIG. 9 shows the state sequences of the local communications module (LCM).

The CA 31 of the LCM controls the switching between the states needed to control the CPU/LCM interface and the latter are shown in detail in FIG. 9. The possible states are:

IDLE 1, IDLE 2: entered via the signals $\overline{TMP}$ or LCMSN.
CAC1: CIO start accepted and entered via signal CIO.
CACN1, CACN2: CIO start rejected and entered by the signals CIO.LCMSN or CIO.$\overline{CLMSN}$.
SAC1, SAC2, SAC3, SAC4: SST analyzed and entered via the signals SST.WST or $\overline{LCMSN}$ or UNCOND.
SACN1, SACN2: SST rejected and entered via the condition SS.$\overline{WST}$.
ARE1, ARE2: address recognized and entered via the condition TMP.ARE.
AREN 1, AREN2: address not recognized and entered via the condition TMP.$\overline{ARE}$.

The signals or (active) logic conditions needed for switching between states are defined below.

LCMSN: read-out of the mail box register by the PM.
$\overline{LCMSN}$: no read-out of the mail box register by the PM.
ARE: address recognized.
$\overline{ARE}$: address not recognized.
AC: command accepted.
UNCOND: unconditional jump.
TMP: synchronization from the CPU.
TPM: synchronization from the SIP.
SST: SST command decoded.
CIO: CIO start command decoded.
WST: LCM ready to provide a status word.
$\overline{WST}$: LCM not ready to provide a status word.
TPM/TMP: the generation of TPM (synchronization from the SIP) automatically causes the generation of $\overline{TMP}$ which switches the state sequencer into an IDLE state. This serves to synchronize the SIP, and a TMP (synchronization from the CPU) is always necessary for switching into another state.

The LCM is in an IDLE 1 state, i.e. mail box clear. On the receipt of a start CIO (condition TMP.ARE), the LCM switches to the state ARE1 (address recognized) and then to the state CAC1 (CIO accepted) and, on the activation of $\overline{TMP}$, to state IDLE 2. When the PM has read out the mail box register (LCMSN), the LCM once more switches to IDLE 1 state (exchange).

If the LCM is in the execute state IDLE2, mail box occupied, the receipt of a CIO start causes it to switch to state ARE2 (address recognized) and then to state CACN2 (CIO not accepted) via condition CIO.$\overline{LCMSN}$. The LCM switches to state IDLE on the next $\overline{TMP}$. While the LCM is in an execute state, it follows the path IDLE2→ARE2→CACN2→IDLE2. As soon as the LCM switches to an exchange state, the activation of LCMSN allows the LCM to switch to the IDLE state where the next CIO start may be accepted, i.e. the switching path is ARE 2→CACN1 →IDLE2, or ARE2→CACN.LCMSN→CACN1→IDLE1.

Likewise, if the LCM is in the state IDLE1 and if it is ready to provide a status word, the SST decoding path will be IDLE1→ARE1→SAC1→SAC3→IDLE1. If the LCM is not ready to provide a status word, the path followed will be IDLE1→ARE1→SACN1→IDLE1.

If the LCM is in the state IDLE2, there are also two possibilities. Where the LCM is ready to provide a status word, the path will be IDLE2→ARE2→SAC2-→SAC4→IDLE2, or IDLE2→ARE2→SAC2-→SAC4→SAC3→IDLE1, or IDLE2→ARE2→ SAC2→SAC1→SAC3→IDLE1. If the LCM is not ready to provide a status word, the path followed will be IDLE2→ARE2→SACN3→IDLE2, or IDLE2-→ARE2→SACN3→SACN1→IDLE1. The various possibilities take into account the fact that the LCM may switch between the execute and exchange states (the dotted line separates FIG. 9 into two parts, that where the CIO start is accepted and that where it is rejected). In addition, due to synchronization problems, the LCM must switch via intermediate and different states, e.g. the activation of LCMSN or $\overline{LCMSN}$.

Where the address is not recognized ($\overline{ARE}$), the LCM will alternate between IDLE1 and AREN1 or IDLE2 and AREN2, successively, depending upon the particular case.

The simulation of an operator command from the control panel is carried out by the allocation of a command block located in an I/O buffer (described later with reference to FIG. 10). The format of a simulation command block is defined below.

| word 1 | 0 | 0 | not significant | | | | | | | X | | | |
|---|---|---|---|---|---|---|---|---|---|---|---|---|---|
| word 2 | X | X | M C N T | I N T | I N S T | I P L | R U N | X | REP | H A L T | X | L R | X |
| | | | PARAMETERS | | | | | | | | | | |

Word 1 contains 2 bits defining a simulation command (OO).
Word 2 contains the bits defining each command to be simulated.
Bit MCN: Master Clear (no parameter)
Bit INT: control pannel interrupt (no parameter)
Bit INST: execution of a program instruction by instruction (no parameter)
IPL: initial loading program (parameters on control panel keys)
RUN: start of a program (no parameter)
LR: load a register, number specified in REP (4 bits) (content parameters to be loaded)
HALT: halt the CPU
X: not used in this particular context.

Figure 10:
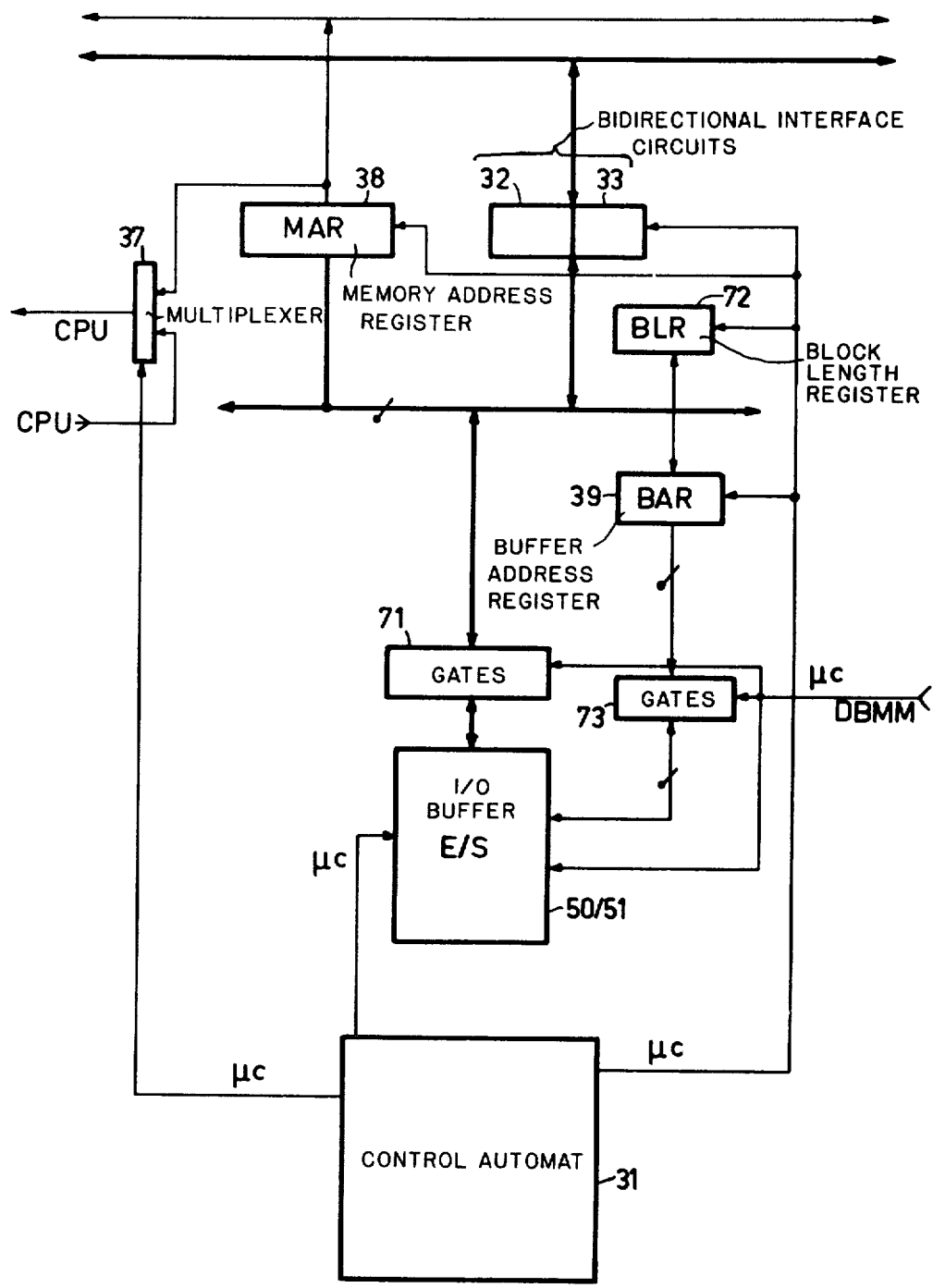
FIG. 10 is an overall structural diagram of the LCM showing the main components controling the exchange mechanism with the LS.

The commands can therefore be simulated by program via the I/O buffers, or directly by the control panel via multiplexer 37 (FIGS. 4 and 10). The interpretation of these controls by the CPU is performed by a module located within it.

The exchange of information blocks between the SIP and the LS by direct access to the store will now be described. The exchange of information blocks is explicitly requested by the PM from the LCM when an I/O buffer is allocated to it. This buffer then contains the directives concerning the requested exchange. The format of a command block is defined below.

| word 1 | I | 0 | X----------------------X | | |
|---|---|---|---|---|---|
| word 2 | Block starting address | | | | |
| word 3 | I T | S | MAD 128 | MAD 64 | X | Length of block (8 bits) |
| word 4 | Start address in buffer (8 bits) | | not significant | | |
| | Data | | | | |
| | Status word | | | | |

Bit IT: issue of an interrupt to the CPU as soon as the transfer operation has been carried out (IT=1). Here, the status word is transferred on the bus when the SST is executed by the CPU.
MAD 128, MAD 64: two most significant bits defining the address of 128 kwords.
Bit S: indicates the direction of exchange.

Figure 11:
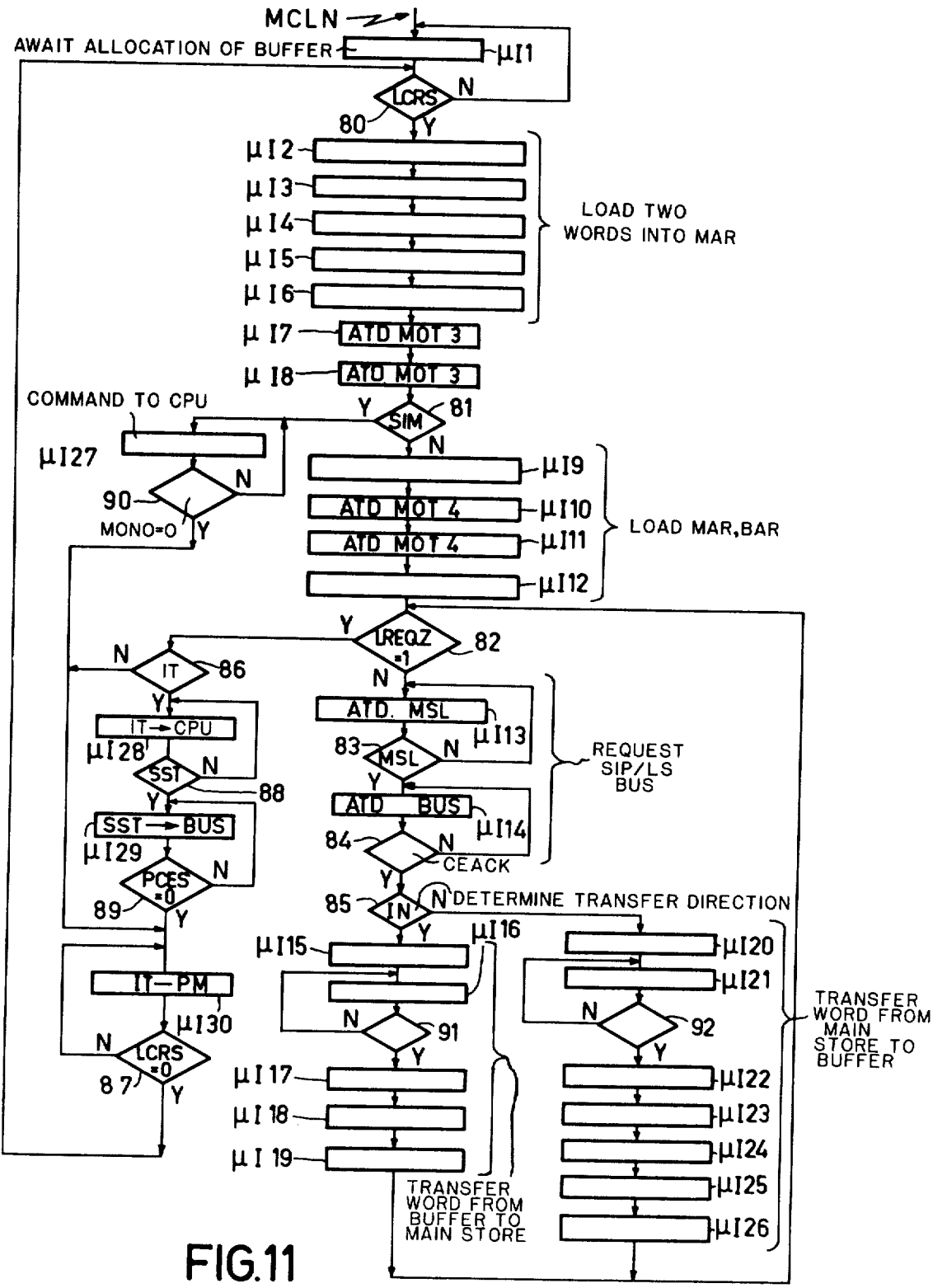
FIG. 11 is a detailed flow chart describing the exchange mechanism between the LCM and the LS.

The exchange mechanism with the LS is described with reference to FIG. 10 (structural diagram of the LCM) and FIG. 11 (detailed flowchart of the microprogram controlling the exchange mechanism with the LS). This microprogram, shown in FIG. 12, which is stored in CA 31 of the LCM, is a typical example of the various microprograms used in this invention.

Initially, CA 31 of the LCM is in the IDLE state shown by micro-instruction 1 (uI1) awaiting the allocation of an I/O buffer (50 or 51) intended for it. As soon as LCRS=1 (test 80, to determine whether the buffer is allocated to the LCM), the first two words of the buffer (command block) are loaded into register MAR (memory address register) 38 of the LCM (group from uI2 to 8). The loading path of register MAR 38 is via logic gates 71 controlled by the micro-commands (uc) of the DBMM. The lefthand bit of the buffer is then tested (test 81). If SIM=0 (simulation command), the command to be simulated in MAR 38 is sent to CPU 15 (uI 27). If SIM=1, counters MAR 38, BAR 39 (buffer address register) and BLR 72 (block length register) are loaded with the exchange parameters contained in words 3 and 4 of the command block (uI 9 to 12). The loading path is via gates 71 for MAR, BLR and BAR, and via gates 73 for addressing the I/O buffer, under the micro control of the appropriate control automats of the LCM and DBMM.

The exchange may then begin. A request is made for the SIP/LS bus (uI 13 and 14 and test 83). As soon as the bus has been obtained (active CEACK in test 84), the transfer of a word is carried out (uI 15 to 19 if the direction of transfer is from the buffer to main store 16, and uI 20 to 26 if it is the other way round). Test 85 defines the transfer direction. The operation −1 is carried out on BLR, +1 on BAR and +2 on MAR. Next a test 82 is made on LREQZ to determine the state of BLR. If BLR≠0, the word transfer sequence begins again.

If BLR=0, bit IT is tested (test 86). If IT=0 an interrupt is sent to the PM (uI 30) indicating that the command is terminated. The LCM switches to the IDLE state when the PM has de-allocated the buffer to the LCM (LCRS=0 in test 87).

If, in test 86, IT=1, an interrupt is sent to CPU 15 (uI 28) and the I/O instruction SST is awaited (test 88). On its receipt, the status word is put on to the bus (uI 29). At the end of the exchange (PCES=0 in test 89 if the state word is accepted by the CPU) an interrupt is sent to the PM (uI 30), the I/O buffer is de-allocated and a return is made to IDLE.

Where a command is simulated (uI 27), a monostable multivibrator is triggered at the start of the simulation and reset at the end. The state of the monostable multivibrator is tested in test 90 and if it is zero an interrupt is sent to the PM as already described. Tests 91 and 92 are made in the word transfer sequences pending the loading signals TRMS. and TRSMST respectively.

In FIG. 10, 32 and 33 are bidirectional interface circuits which store the data during an exchange, while 37 is a multiplexer which selects either the command from the I/O buffer via MAR 38 or those from the control panel (PAN SIM) under control of control automat 31.

Figure 12:
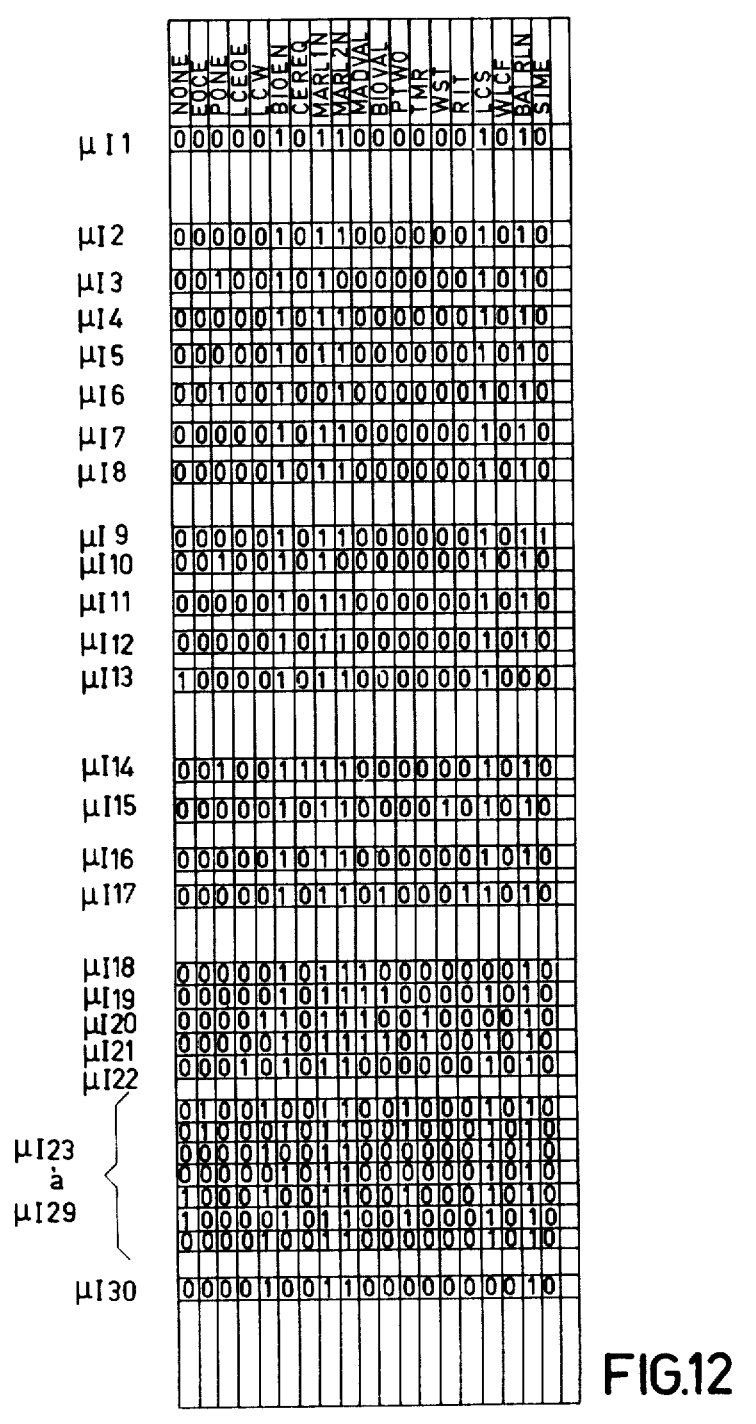

The microprogram for this sequencer is described in detail in FIG. 12 and the exact description of each microinstruction bit is given below.

NONE: −1 (decrement) on the length of the block to be transferred
EOCE: clearing of the P 800 bus (LS) by the LCM
PONE: +1 (increment) on the address of the I/O buffer
LCEOE: interrupt to the PM indicating the end of the execution of a command
LCW: READ/WRITE on the I/O buffer
BIOEN: BIO (Bus in/out data) activated
CEREQ: request for P 800 bus by the LCM
MARL 1N: loading of register MAR (right-hand part)
MARL 2N: loading of register MAR (left-hand part)
MADVAL: main store address→bus (valid)
BIOVAL: data→bus (valid)
PTWO: +2 (double increment) on the address of the main store TMR: synchronization sent to the main store WST: wait state (interrupt to the CPU at the end of an exchange)

RIT: reset to zero of interrupt on receipt of SST

LCSA: synchronization of an operation on the I/O buffer

WLCF: loading of the mail box of the PM (LCM→PM)

BALRLN: loading of registers BAR, BLR

SIME: simulation.

CMI 22 is responsible for controlling the SIP access to the interface with the communications network via CM 13, sending the CM the commands loaded by the PM into a mail box register of the CMI (42) and loading the results from the CM into the mail box register (41) of the PM before alerting the mail via an interrupt.

Figure 13:
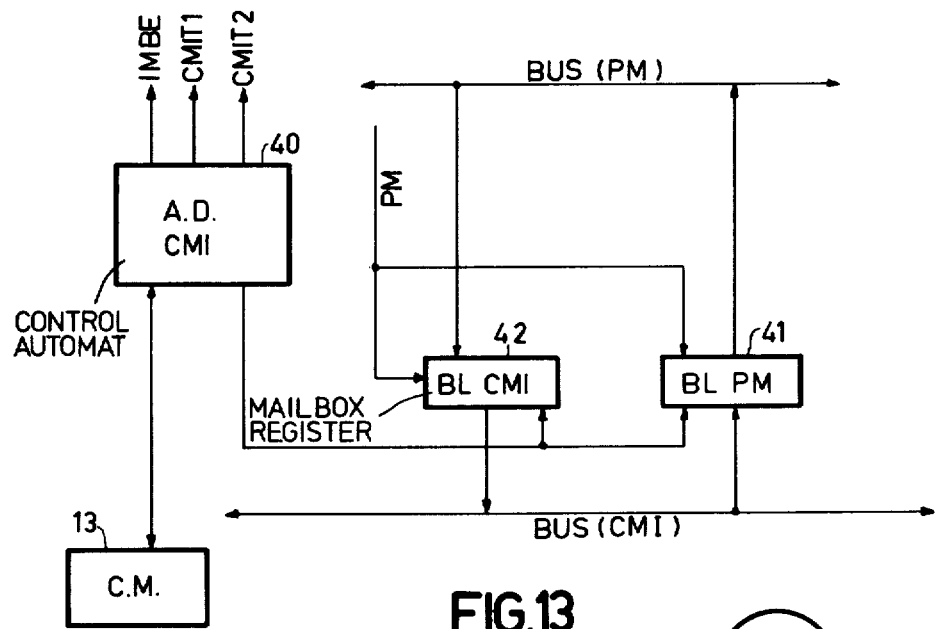
FIG. 13 is an overall structural diagram of the CMI (communications interface module) showing the main components used to control the interface between the SIP and the CM.
Figure 14:
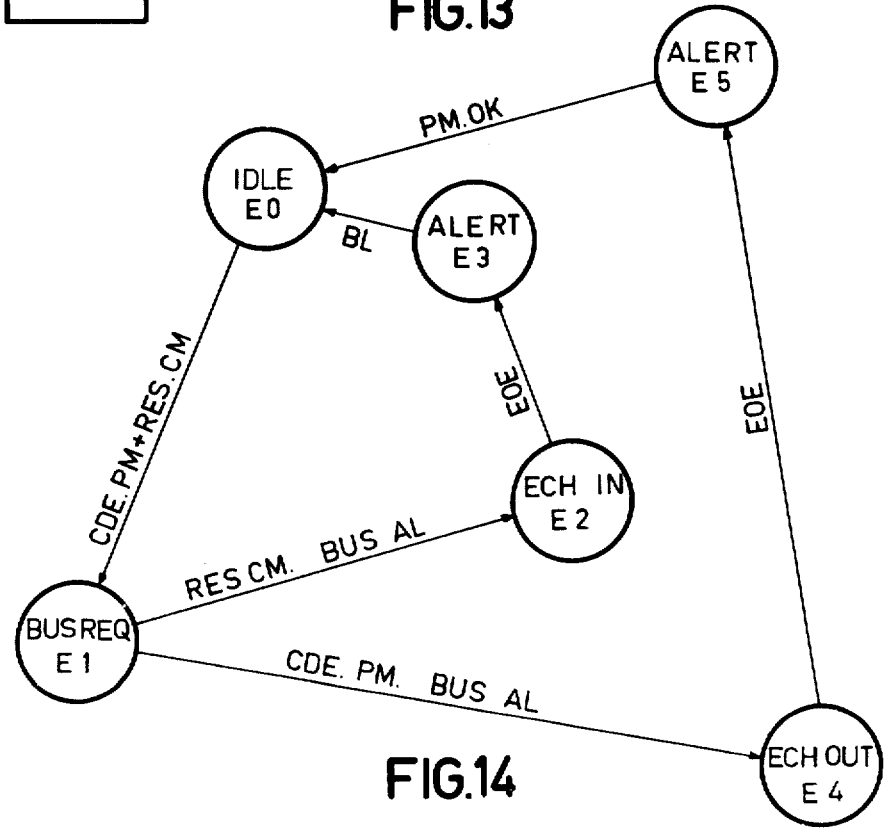
FIG. 14 shows the state sequences of the CMI control automat.

The exchange mechanism is described with reference to FIG. 13 (structural diagram of the CMI) and FIG. 14 (state sequences of the CMI control automat). There are two possibilities:

1. Command word sent to the CM from the PM

As soon as a command word is placed in the mail box register (BLCMI) 42 by the PM, the control automat 40 switches to state E1 (BUS REQ) from state E0 (IDLE) in which an ICM/CM interface request is initialized. On receipt of a signal indicating that the interface has been allocated to the ICM (BUS AL.), the latter switches to state E4 (ECH OUT) and transmits the command WRITE after having put the address of the CM on the address bus and the contents of (ICM LB) 42 on the data bus. On detection of an end of exchange (signal EOE), control automat 40 issues an interrupt (IMBE) to the PM specifying that the CMI mail box register is once more available for communication of another command and at the same time switches to state E5 (ALERT PM). The control automat returns to state E0 (IDLE) as soon as the PM executes an I/O instruction (READ) which is interpreted by the ICM as an acknowledgment of the interrupt (PM.OK).

2. Result word from the CM to the PM

As soon as an interrupt from the CM is received by the CMI control automat, the CMI switches from state 1 (IDLE) to state E0 (BUS REQ) in which a bus request is initialized. On the receipt of a signal indicating that the bus has been allocated to the ICM (BUS AL.), the latter switches to state E2 (ECH IN) and issues the command READ after having put the address of the CM on the address bus. On detection of an end of exchange and after the result word has been loaded into the mail box register of the PM (41), the control automat 40 switches to state E3 (ALERT PM) and issues an interrupt CMI T1 (or CMI T2) to the PM. As soon as the PM has read out its mail box by executing an I/O instruction (READ), the control automat 40 switches to state E1 (IDLE). The conditions needed for switching between states are shown in FIG. 14.

Figure 15:
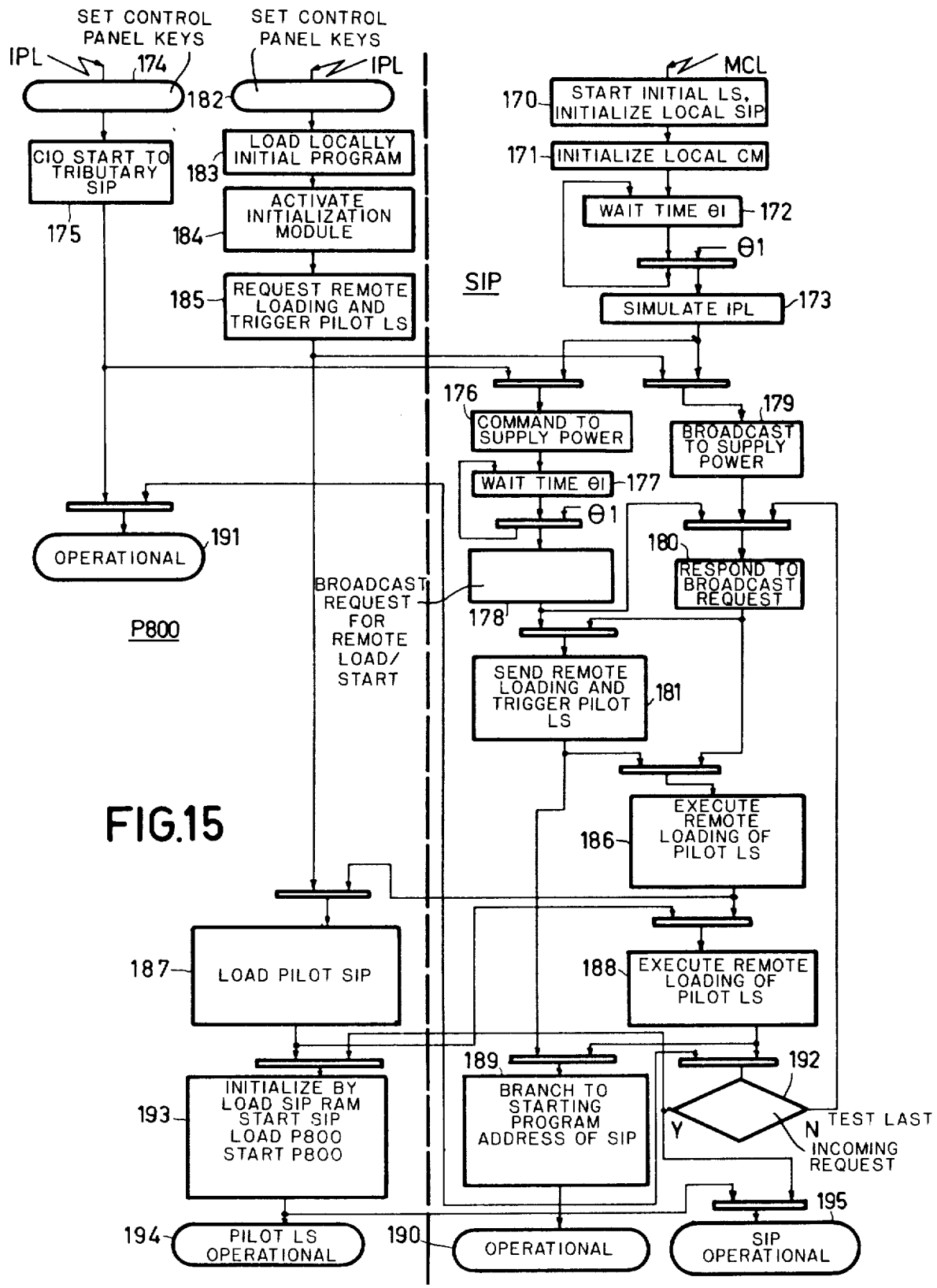
FIG. 15 is a flow chart describing the initialization, remote loading and remote starting procedures from an LS piloting the other LS in the system.

The initialization functions, which include the procedures of initialization, remote loading and remote starting are described with reference to the flow chart of FIG. 15. These procedures are stored in the PROM store (2 kwords) of the SIP.

The LS may be of different types.

A tributary LS has no automatic starting and loading capacities and must be remote-loaded and remote-started.

A pilot LS has self-loading, self-triggering capacities (hardware and software) and may remotely load and start tributary LS.

An initial LS is used by the operator responsible for the starting and initialization of the global distributed data processing system. This may be a pilot LS or tributary LS.

The initial LS is started by the operator, and the local SIP and its peripherals are initialized by the master clear (MCL) of the system, ref. 170 in flow chart 15. The SIP of the initial LS initialized the local CM ref. 171 before locally simulating the IPL (initial program loader) ref. 173. The initial SIP waits for a time θ1 before simulating the IPL to allow the LS time stabilize, particularly the disc units, ref. 172.

If the initial LS is a tributary LS it sends a start CIO IPL to the tributary SIP (control panel keys set to the address of the SIP) refs. 174 and 175. The local (tributary) SIP on receipt of a CIO IPL issues a command to supply power to all the LS (execution by the local CM which is powered) and waits for a global system stabilization time θ1, refs. 176 and 177. As soon as the whole of the system has stabilized, the SIP broadcasts a request for the remote loading and remote starting of the main store of its LS (16 on FIG. 1) and of the RAM (25 on FIG. 4) of the SIP itself, ref. 178. On receipt of this broadcast request, the pilot LS which are capable of remotely loading the tributary LS concerned respond positively, ref. 180. The tributary LS then issues a remote loading command to a selected pilot LS ref. 181 which undertakes the initialization of the tributary LS.

If the local LS is a pilot LS ref. 182, on the simulation of IPL by its SIP, the initial program is loaded locally (the keys of the control panel indicating the peripheral used for loading) ref. 183, and then an initialization module capable of remotely loading the tributary LS and self-loading the local LS (pilot here) is activated, ref. 184. The numbers of the LS which can be remotely loaded by each pilot LS are given to the local SIP which, on receipt of incoming requests which can be satisfied by the local pilot LS, responds positively to the tributary LS concerned. Where the initial LS is a pilot LS, the SIP issues a power on command to all, ref. 179.

The tributary LS then sends a command for remote loading to the selected pilot LS (the first positive reply received from a pilot LS is selected) ref. 181, and the SIP proceeds with the remote loading and starting of the tributary LS via a request for remote loading and triggering to its pilot LS ref. 186, followed by the execution of this order, ref. 188, which awaits the loading of the pilot SIP, ref. 187. This command consists in executing in the tributary LS the remote loading of system and user programs into the main store, the simulation of LR, LCM, RUN on the control panel of the P 800, the remote loading of the coordination execution in the RAM of the tributary SIP and the branching to the start address of this program of the SIP, this being shown by ref. 189. At the end of execution, the tributary SIP and LS switch to an operational state, ref. 190 and 191.

When the pilot LS has loaded or is sure that another pilot LS's loaded all the tributary LS which it can load remotely (via the last incoming request test, ref. 192) it initializes itself, ref. 193. This consists in loading the RAM of its own SIP, starting the SIP at the level of the RAM, loading its own P 800 system and starting it. At the end of this sequence, the pilot LS and SIP switch to an operational state, ref. 194 and 195.

DESCRIPTION OF THE COORDINATION FUNCTIONS

The operation of the various elements of the SIP and the communication mechanisms with its own LS and the others located on the communications network via the CM have already been described. What now remains is therefore to describe explicitly the coordination functions allocated to the coordination layer, i.e. the SIP.

The coordination layer, i.e. the SIP, performs the following actions on the commands from an LS via its operating system.

- Initialization of the entire system (already described).
- Allocation of the resources according to availability and local load.
- Communications between processes belonging to different users applications.
- Translation of address and coding parameters between the global and local levels.
- Detection of faults in the system.
- Protection of applications by monitoring the rights of access to the resources and object at the level of each LS.

Three types of command are sent from the local system to the coordination layer by the communication mechanisms already described (connection, transmission reception block, etc.). They are the commands, messages and service requests.

Commands are sent either in the addressed mode or in the broadcast mode and are directly executed by the LS and SIP concerned. These may be used to initialize the overall system and also during reconfiguration or maintenance, i.e. when the system does not yet have or no longer has the capacity to process other orders.

Messages sent to a mail box (logical addressing) allow processes belonging to respective different user applications to communicate.

Service requests are sent by active processes which wish to acquire a resource.

The receipt of these three types of orders implies the initilization of a micro-transaction consisting of several steps concerning the processing of the order. A micro-transaction is set up as soon as a command, a message or a request is received and is destroyed once the order has finally and completely been performed. Micro-transactions are transferred between LS by the communication mechanisms previously described.

The steps make it possible to synchronize the various LS concerned and provide starting points in the event of reconfiguration. Every micro-transaction consists of a two-word header, followed by information constructed in relation to the nature of the order, as shown below.

```
word 1   | N° of micro-transaction (16 bits) |
word 2   | Nature (8 bits) | Step (8 bits)   |
```

In this invention, only the commands may be directly addressed to an LS. The other orders always comprise at least one step during which the information is broadcast to an LS sub-assembly or to all of them.

The execution of the orders received from outside the LS is described below.

Command format:

```
word 1   | N° of micro-transaction |
word 2   | Nature   | Step         |
word n   |        Command          |
```

A command is always executed by the LS units addressed.

The messages are directly loaded into the specified mail boxes if the size of the message sent will fit into the available space in the mail box. A distinction should be made between the mail boxes used in the format of an order and those of the SIP. The latter represent a physical space (usually a register) allowing the various components of the SIP and in the CM to intercommunicate, while the former represent a logical space or logical address referenced by its name (associative reference). The name of the mail box (LB), for example, indicated in a message describes a logical space referenced by its special name in the RAM store of the SIP.

command format:

```
word 1         | N° of micro-transaction      |
word 2         | Nature           Step        |
               |       Order                  |
               |       Order                  |
word n         |       LB name                |
               |       LB name                |
               |       LB name                |
               | Name of source process       |
               | Name of source process       |
word (n + M)   | Name of source process       |
word (n + M) + 1 |     Length of message      |
```

The orders may, for instance, define the opening, closing, reading or writing of the LB by creating processes.

The reading of a mail box by the destination process is carried out during its initial execution or by positioning an event bit if the process is being executed.

N steps may be distinguished in the microtransaction where N > 1; an example is given below.

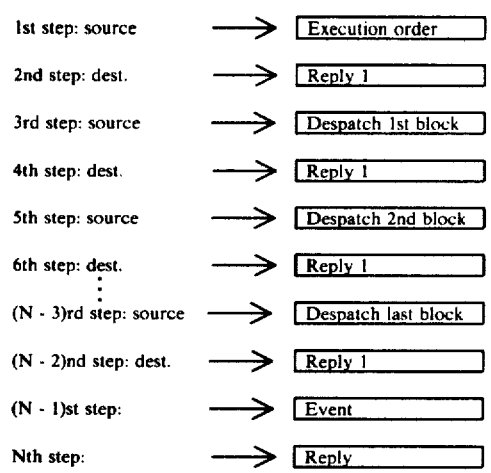

When a complete message is arranged in a mail box, an event is broadcast so as to inform the creator process that a message is available for it. If this process is being executed, it can then program a read-out of the mail box. The execution order and the event are sent in broadcast mode to locate the mail box and the creator process in the SIP concerned. The format is defined below.

| word 1 | Code (3 bits) | Address of next link (13 bits) |
|---|---|---|
| | LB name | |
| | LB name | |
| | LB name | |
| | Name of creator process | |
| | Name of creator process | |
| | Name of creator process | |
| last word | Remaining empty space in LB | |

The three-bit code indicates the nature of the descriptive block. There are eight possible types.

If the address of the next link = 0, the present block is the last.

In the case of a message, therefore, the destination SIP carry out a filtering process on the mail box name, the size of the message and possibly on the name of the source process.

There are two possible types of service requests. All the resources defined by the source process are concerned, e.g. the updating of multiple copies of data bases. The mechanism used is similar to that used for the mail boxes, i.e. an execution order is directly broadcast while any data accompanying it are sent as a function of the storage space available at the destinations. The format is defined below:

| word 1 | N° of micro-transaction | |
|---|---|---|
| word 2 | Nature | Step |
| word 3 | Request | |
| | Request | |
| | Name of domain | |
| | Name of domain | |
| | Name of domain | |
| | Identification of the user resource | |
| | Associated parameters | |
| | Associated parameters | |
| word n | Associated parameters | |

Figure 16:
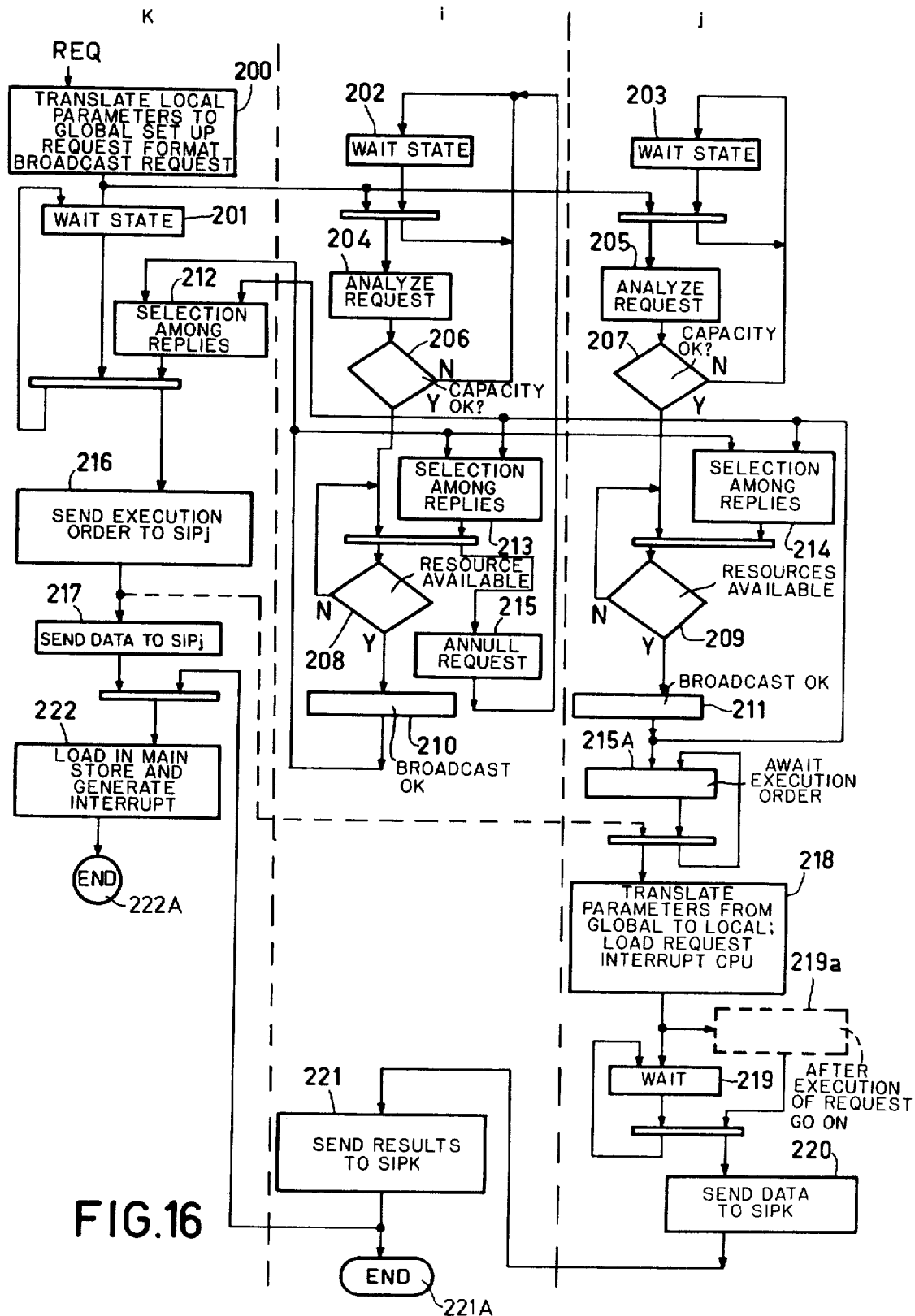
FIG. 16 is a flow chart describing the processing of a service request by the SIP connected to the communications network.

The detailed processing of a request is described with reference to the flow chart of FIG. 16. This processing corresponds to the SIP pre-processing, source and destination, described in the general flow charts of FIG. 2, refs. 106 and 108. The left hand column refers to the origin SIP, the middle column to destination SIPi, the right hand column to further destination SIPj. When the SIPk (source) receives a service request from a process located in its own LS, it undertakes certain necessary steps, e.g. translation of the parameters (local→global), assembly of the request into a query format and its transmission to all (represented by 200). The SIPk (source) switches to a wait state, ref. 201, this being the selection phase.

This service request is received by all the SIP connected to the overall communications network and, on the receipt of an incoming request, each SIP analyzes the information associated therewith. In the flow chart of FIG. 16, the request is received by the SIPi (destination) and SIPj which are in the wait state, ref. 202 and 203 respectively. The wait state relates only to the service request in question. In this invention, a request issued on the communications network is received by all the SIP's, including the source SIP, i.e. the concept of privilege does not exist. The incoming request is analyzed (refs. 204 and 205) by each SIP with respect to the following:

The definition of the request makes possible an initial screening of the LS which should have the resources to process the request received. For example, a compiler is needed for a compilation request, and the telecommunications programs (network and procedure) are needed to process a telecommunication's request.

The application domain name makes possible a second screening giving an equitable distribution of the applications relative to the available resources and thus to the LS, and also makes possible the definition of interactions between these applications (protection and balancing). A table of the application domains known is constructed at the level of each SIP when the overall system is generated (after initialization).

A third screening process may be carried out on the user resource requested by consulting a descriptive table of the local resources (located in the main store of the SIP).

After these three screening processes, each SIP can determine whether its LS has the capacities needed to process the request, refs. 206 and 207. If the result of these analyzes is negative, the SIP switches to the wait state. If the result is positive, another analysis is performed to determine whether these resources are available, refs. 208 and 209. If not, the SIP awaits availability before replying. When all the resources asked for are available (system and user) within an LS, an acknowledgment of receipt is broadcast and all the necessary resources are allocated to the source SIP, while the SIP itself goes into the stand-by state, refs. 210 to 211. A distinction must be made between the system and user resources. For example, a user resource may be the compiler in a request for the compilation of a program, or a central processing unit for the execution of a program. In a telecommunications request, for instance, the programs may be the user resources but the protocols and procedures of the network are the system resources.

The system selects an LS from among those giving a positive reply, one possible selection criterion used being that the first positive reply is selected. The architecture of the system allows only one positive reply to be selected by the source SIP if several SIP give a simultaneous positive reply.

Here, it will be assumed that the two SIP's, SIPi (dest.) and SIPj (dest.) have the required resources and that they are available. SIPi (dest.) and SIPj (dest.) reply positively via a broadcast OK (refs. 210 and 211) but the reply from SIPj (dest.) is received before that from SIPi (dest.) by the SIPi (source). The automatic selection mechanisms ensures that SIPj (dest.) is selected (refs. 212 to 214), one property of the communications network being that a broadcast transmission is received by all at the same time.

Thus the SIPi (dest.) is informed in this broadcast transmission that it has not been selected, the request is annulled (ref. 215) and a return is made to the wait state 202. The SIPk (dest.) selected awaits the execution order from the SIPk (source), ref. 215A.

Figure 17:
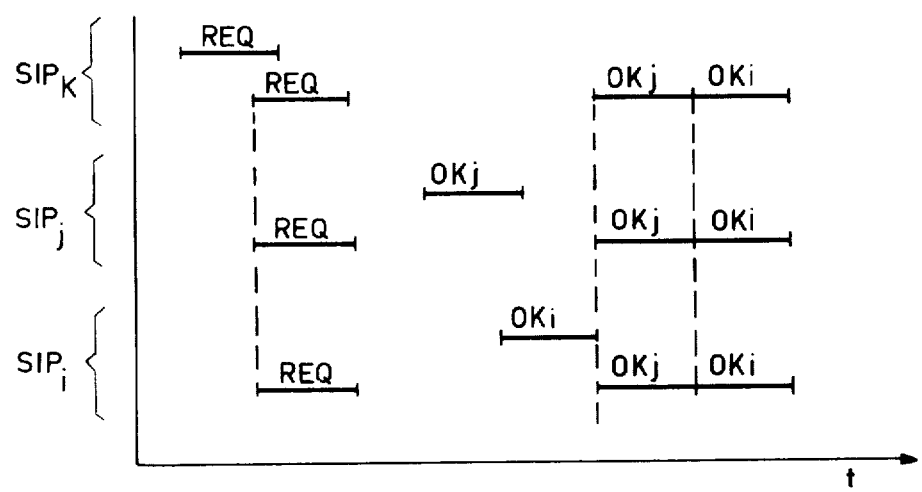

FIG. 17 shows the automatic selection principle. SIPi, SIPj and SIPk are connected to the communications network. The SIPk issues a request broadcast to all (REQUEST), received by all with a time delay. In the next transmission frame, SIPj, and SIPi reply positively (OKj, OKi) and these replies are received by all, but OKj is received by all before OKi because of its location on the network, and thus every unit is informed of the selection of SIPj. SIPk sends the execution order to SIPj, and SIPi is freed. The execution phase begins (described by refs. 216 to 221) in which the execution order is sent to SIPj, 216, any data sent 217, the translation of the parameters from global to local, the request is loaded into the main store of the LS and an interrupt is sent to the CPU for the execution of the request, 218. The SIPj switches to a wait state 219 and, at the end of the execution of the request 219a sends the data to the SIPk, 220. Then the results are sent to the SIPk, 221 which, in turn, loads them into the main store of its LS and informs it via an interrupt 222. The SIP switches to state END 222A relating to the request concerned.

In general, the SIP source awaits the number of responses specified in the service request issued. When this number is reached, the source SIP terminates the micro-transaction or continues it if the data have to be sent. The number of steps required for the emission of data depends upon the table relative to the data blocks and the temporary store available in the units concerned.

In a second type of service request, a choice of m resources is possible out of n, where n>m. In this case, the first step consists in executing the order received only after automatic selection performed based on the analysis of the replies sent by the various LS capable of processing the request.

The format of this type of request (query and execution) is defined below:

| word 1 | N° of micro-transaction | |
|---|---|---|
| | Nature | Step |
| word 2 | Request | |
| word 3 | Request | |
| | Source process level | |
| | Name of domain | ⎫ 6 charac- |
| | Name of domain | ⎬ ters |
| | Name of domain | ⎭ ASC II |
| | User resource identification | |
| | User resource identification | |
| | Associated parameters | |
| word n | Associated parameters | |

One field in the request word is designed to specify the number of resources requested (m). Each SIP receiving this query analyzes it and decides in the same way as before its capacity to process the incoming request. If the resources requested are available, a positive reply is broadcast and these resources are allocated to the source process of the request. In the query the number of resources required is specified (m). As long as this number is not reached, the SIP, having the necessary capacity and receiving the replies from the others, reply as soon as the resources requested are available. As soon as this number is reached, the SIP which are capable but have not yet replied cancel the request and the source may issue data associated with the request. In the event of simultaneity, the LS's capable of replying positively are selected as already described if the specified number is reached after receipt of their own reply. Otherwise, the request is cancelled and the resources freed. In fact, there is automatic self selection based on the analysis of the request issued and the replies provided by the available SIP.

Each resource is described in an associated 8-word descriptive block (similar to the mail boxes). The format is defined below.

| Code (3 bits) | N° of unit for attachment (6 bits) | N° of program for attachment (7 bits) |
|---|---|---|
| N° of authorized domains (8 bits) | | Global user file code (8 bits) |
| Local file code (8 bits) | | Disc file code (8 bits) |
| File name | | |
| File name | | |
| File name | | |
| Link on file name | | |
| Link on file code N° | | |

The three-bit code defines the type of resource requested from among eight possibles:
(1) mail box,
(2) logical files,
(3) physical peripherals,
(4) communication line,
(5) queue,
(6) descriptive table of the active processes, The two unused possibilities may be used to specify other resources.

Selection is made by taking the first resources which reply (identical for all).

The replies are sent as soon as the necessary resources are available (system and user).

The processing unit (CPU) is automatically allocated if the source process has a higher priority or the same priority as the procedure being executed. Otherwise the response time is weighted as a function of the load on the processing unit (percentage occupation) as shown on FIG. 18. $T_{max}$ is calculated (programmed in the two timers PM) so as to be a low fraction of the processing time of the service request, but also so as to be significant in view of the normal variations in response time. Thus the use of the resources are optimized by sharing them fairly between the applications.

The translation of the parameters is necessary to allow already developed applications to use the common resources while retaining their local identifiers (file code $N^o$, code line $N^o$, etc.). Translation is thus carried out into local code $N^o \rightarrow$ global code $N^o$ by the concatenation of the local code $N^o$ to the unit $N^o$.

The translation global code $N^o \rightarrow$ local code $H^o$ is carried out using a correspondence table. Certain translations are used to reduce the storage space occupied in the local units. The field name in 6 ASCII characters (global) is transformed into 1 octet (8 bits) at the level of an LS.

The SIP can detect a loss of coherence in a message or the failure of an LS via the CM. The CM can detect the abnormal behaviour of a source or a destination, or the loss of information, and can thus inform the SIP on such detection. The information supplied is:
Loss of information;
Transmission of an impossible message (repeated errors, absence of reply from the destination);
Receipt of an impossible message (repeated errors, absence of reply from the source).

The SIP acts on reaction of one of these items of information from the CM.

A loss of information can be detected because a coherent message is always framed by two control words (STX, ETX). STX indicates start of message and ETX its end. As soon as the CM detects a loss of information (receipt of a packet by a destination whereas said destination has sent a negative acknowledgment of receipt, RNR on a broadcast call), it eliminates all information from the channel concerned until the detection of a new coherent message (STX), implying that the SIP will receive an incomplete message without (ETX). In this case, as soon as the SIP receives a new message from a source (STX) whereas the previous one has not been terminated by (ETX), it cancels the incomplete message and asks for its retransmission from the corresponding source.

When the SIP receives information pertaining to the transmission or reception of an impossible message, it isolates the LS at the origin of the problem by sending a command to the CM to disconnect the LS concerned. On receipt of this command, the CM no longer takes account of the information received in the frames allocated to the specified LS until it has been reconnected

Appendix

Interface physical SIP/LS P 800 (bus signals)

| Type of lines | Number of lines | Description | Mnemonic | Source | Dest. | Function |
|---|---|---|---|---|---|---|
| Control | 1 | accepted | ACN | SIP | CPU | I/O dialog |
| Control | 6 | bus interrupt coded lines | BIECO0, BIECO5 | SIP | CPU | queries |
| Control | 16 | I/O lines bus | BIO0ON, BIO15N | TOUS | TOUS | data channels |
| Control | 1 | bus occupied | BUSYN | SIP CPU | SIP CPU | bus control |
| Control | 1 | character | CHA | SIP CPU | Mem | character mode exchange |
| Control | 1 | request bus | BUSRN | SIP | CPU | bus request |
| Control | 1 | acknowledge | CLEARN | CPU | SIP | master clear (MCL) |
| Address | 18 | address lines | MAD00, MAD15, MAD64, MAD128 | SIP CPU | Mem SIP | addressing |
| Control | 1 | selected master | MSN | SIP CPU | SIP CPU | priority control |
| Control | 1 | input OK | OKI | CPU SIP | CPU SIP | selection of next master |
| Control | 1 | output OK | OKO | CPU SIP | CPU SIP | selection of next master |
| Control | 1 | power supply failure | PWF | CPU | SIP | power supply control |
| Control | 1 | monitor external interrupts | SCEIN | CPU | SIP | interrupt sampling |
| Control | 1 | monitor priority chain | SPYC | CPU | SIP | priority control |
| Control | 1 | Master clock to peripheral (CU) | TMPN | CPU | SIP | exchange sync. signal |
| Control | 1 | master clock to store | TMRN | CPU SIP | Mem. | exchange sync. signal |
| Control | 1 | CU clock to master | TPMN | SIP | CPU | exchange sync. signal |
| Control | 1 | clock store to master | TRMN | Mem. | SIP CPU | exchange sync. signal |
| Address | 16 | address lines | ADR0N, ADRFN | SIP CM | SIP CM | addressing |
| Control | 1 | bus sync. | BULKN | SIP | SIP CM | synchronization |
| Control | 1 | bus input priority | BPRNN | SIP of CM | SIP | selection of next master |
| Control | 1 | bus output priority | BPRON | SIP | SIP of CM | selection of next master |
| Control | 1 | bus request | BREQN | SIP | bus control | bus request |
| Control | 1 | bus occupied | CBUSYN | SIP CM | SIP CM | bus control |
| Control | 1 | communications module interrupt | CMITN | CM | SIP | interrupt |
| Data | 16 | data bus | DAT0N, DATFN | SIP CM | SIP CM | data bus |
| Control | 1 | initialization | INITN | SIP | CM | initialization |
| Control | 1 | I/O READ command | IORON | SIP | CM | exchange sync. signal |
| Control | 1 | store WRITE command | IOWON | SIP | CM | exchange sync. signal |
| Control | 1 | store READ command | MRDON | CM | SIP | exchange sync. signal |
| Control | 1 | store WRITE command | MWTON | CM | SIP | exchange sync. signal |
| Control | 1 | XFER recognition | XACKN | CM | SIP | exchange sync. signal |

Appendix-continued

| | | Interface physical SIP/LS P 800 (bus signals) | | | | |
|---|---|---|---|---|---|---|
| Type of lines | Number of lines | Description | Mnemonic | Source | Dest. | Function |
| | | | | SIP | CM | |

LIST OF REFERENCES (1) E. Douglas Jensen "The Honeywell Experimental Distributed Processor An Overview". Computer, January 1978, p 28-38.
(2) Heart F.E., Ornstein S.M., Crowther W.R. & Barker W.B. "A New Minicomputer/Multiprocessor for the ARPA Network" NCC (1973) p 529-537.
(3) Ornstein S.M., Crowther W.R., Kraley M.F., Bressler R.D. & Michel A. "Pluribus - A Reliable Multiprocessor" NCC (1975) p 551-559.
(4) Vidas B. Glydys & Judith A. Edwards "Optimal Partitioning Of Workload for Distributed Systems" Digest of Papers, Compcon 76 Fall, September 1976, p 353-357.
(5) Thomal O. Wolff "Improvements In Real-time Distributed Control". Digest of Papers, Compcon 77 Fall, September 1977, p 409a-409g.
(6) Le Cann G. "A Protocal to Achieve Distributed Control In Failure Tolerant Multicomputer Systems". SIRIUS Research Report IRIA CRT1 002 1977.
(7) Farber D.J. "A Distributed Computer System". Report 4, Dept. Of Information And Computer Sciences, University of California, Irvine, U.S.A.

What is claimed is:

1. A distributed data processing system, comprising a general communications network and a plurality of local systems which each include a central processing unit, associated memory, a peripheral device and a residential program, in which distributed system control of the data processing in each local system is effected by the local system itself, wherein each local system is interfaced to the network by a respective system intercommunication processor, each system intercommunication processor comprising a preprogrammed processor, local interfacing means for interfacing to the associated local system, network interfacing means for interfacing to the communications network, and buffer means bidirectionally coupled to the associated preprogrammed processor, network interfacing means and local interfacing means, each system intercommunication processor comprising:

translation means for translating global addressing and coding parameters into respective local addressing and coding parameters and vice versa;

resource procuring means for receiving a resource procurement request from the associated local system and thereupon interrogating other local systems by means of the network for locating available resources in said other local systems, and analyzing acknowledgments received by means of the network and thereby locating available resources (if present) and in the case of parallel positive acknowledgments signifying the presence of available resources effecting a choice thereamong while freeing unchosen resources;

control means comprising protection means for selectively controlling access to the local resources and information objects in the associated local system upon the receipt of requests via the network in dependence upon the availability of such resources and/or objects and the authorization of a user program giving rise to such requests, optimization means for sharing the use of a resource between user programs, and failure management means for monitoring messages received for lack of coherence and thereupon generating a request for a repeat, and upon reception of such a request for a repeat via the network effecting a retransmission of the afflicted message, and in the case of repeated failure of transmission or reception of a message by a local system generating a failure detection signal and isolating the failed local system from the general communications network; and simulation means for simulating control-panel-emanated signals for effecting a reset to an initial state for a sub-system of said distributed data processing system as defined in the relevant signal, an initial program load, an instruction by instruction step-wise program execution, a loading and reading of the general registers in a local system, an interrupt of programs being executed in the associated local system, and a start of specific programs;

said system intercommunication processor including initialization means for receiving from a predetermined pilot local system a remote loading request and thereupon loading a read/write memory in the associated local system and in the system intercommunication processor itself and for receiving a remote start request over the network for starting execution of a program in the local system and associated system intercommunication processor.

2. A system as claimed in claim 1, characterized in that each said preprogrammed processor comprises a processor module comprising a microprocessor with a read/write store, a program store, a first control automat, an interrupt and priority monitoring system and a timer system, each said local interfacing means comprises a local communication module comprising a second control automat and logic circuits for decoding input/output instructions, said local communication module, controlled by the associated processor module, providing communication between the said buffer means of the relevant system intercommunication processor and the central processing unit of the associated local system via input/output instructions and an interrupt mechanism, and between said buffer means of the relevant system intercommunication processor and the memory of the associated local system by direct access means, each said network interfacing means comprises a communication interface module comprising a third control automat and first and second mail box registers for the associated processor module and the communication interface module itself, respectively, said communication interface module, controlled by the associated processor module, providing communication between said buffer means of the relevant system intercommunication processor and the communications network by means of input/output instructions, an interrupt mechanism and said mail box registers, and including means for sending instructions loaded by the associated processor module into said second mail box register to said network, means for loading the replies from said network into said first mail box register, and means for alerting the associated processor module via said interrupt mechanism, and each said buffer means comprises first and second triple-access input/output buffers, each said system intercommunication processor including a buffer management module for controlling said buffer means and comprising a fourth control automat and allocation means for said buffer means, which allocation means is controlled by the associated processor module, said buffer management module providing communication between the associated processor module and the associated local system via the associated local communication module, between the associated processor module and the network via the associated communication interface module, and between the associated local system and the network via the associated communication interface module;

said allocation means being capable of allocating said first and second input/output buffers to the associated local system, the associated processor module and the network independently of each other.

3. A system as claimed in claim 2, wherein said translation means are included in said processor module and comprise means for translating local parameters into global parameters by concatenation of the local parameters on the resource numbers of resources requested, and means for translating global parameters into local parameters using a correspondence table stored in the said read/write store.

4. A system as claimed in claim 2 or claim 3, wherein said resource procuring means have a first state for issuing a resource request from the associated system intercommunications processor to a single destination system intercommunications processor in an addressed mode, a second state for issuing a resource request from the associated system intercommunications processor to any other system intercommunications processor present in the system in a synchronous broadcast mode specifying the number m of resources required, a third for acknowledging after such first state a positive reply signal, a fourth state for selecting after such second state only m positive reply signals out of any positive reply signals received as based on a predetermined selection criterion and thereafter collectively communicating which positive reply signals have been selected to all system intercommunications processors present in the system, and wherein said control means have a first state for accessing, upon reception of a broadcast resource request or resource request addressed to the relevant systems intercommunication processor, a descriptive table loaded in the said read-write store of the relevant processor module, which descriptive table contains an identification and present-state-of-use table for the local resources and upon availability of the resource requested emanating a positive reply to the system intercommunications processor issuing the request thus received, and a second state in which it awaits, after it has been in its first state, an acknowledge signal for said positive reply or, as the case may be, a collective communication indicating selection of another system intercommunications processor and thereupon freeing its own resources.

5. A system as claimed in claim 4, wherein m=1.

6. A system as claimed in claim 4, wherein said predetermined selection criterion assigns preference to an earlier positive reply over a later positive reply.

7. A system as claimed in claim 4, wherein said protection means comprise means for selectively allowing access to a predetermined resource in dependence upon the identity of the user program originating the resource request in question using an allowability table co-stored with said identification and present-state-of-use table.

8. A system as claimed in claim 4, wherein said otimization means comprises means for selectively allowing access to a predetermined resource based on the priority level of the user program originating the resource request in question, which level is present in the resource request, in comparison to the priority level of a user program presently occupying the resource in question, transferring the resource to the user program originating the resource request immediately if the priority of the occupying user program is lower than that of the requesting user program, and by transferring the resource after a predetermined, load-dependent time interval if the priority of the occupying user program is higher than that of the requesting user program.

* * * * *